(12) United States Patent
Shirayanagi

(10) Patent No.: US 7,121,664 B2
(45) Date of Patent: Oct. 17, 2006

(54) METHOD OF DESIGNING ASPHERICAL SPECTACLE LENS

(75) Inventor: Moriyasu Shirayanagi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/177,593

(22) Filed: Jul. 11, 2005

(65) Prior Publication Data
US 2006/0007394 A1   Jan. 12, 2006

(30) Foreign Application Priority Data
Jul. 12, 2004  (JP) .............................. 2004-205235

(51) Int. Cl.
*G02C 7/02* (2006.01)

(52) U.S. Cl. ....................... 351/177; 351/159

(58) Field of Classification Search ................ 351/159, 351/175, 177
See application file for complete search history.

(56) References Cited

U.S. PATENT DOCUMENTS

| | | | |
|---|---|---|---|
| 5,353,072 A * | 10/1994 | Tejima et al. ............... | 351/159 |
| 5,479,220 A | 12/1995 | Komatsu et al. ............. | 351/159 |
| 5,767,939 A | 6/1998 | Komatsu et al. ............. | 351/159 |
| 6,012,813 A | 1/2000 | Qi ................................ | 351/159 |
| 6,554,426 B1 | 4/2003 | Shirayanagi ................. | 351/177 |
| 6,595,639 B1 * | 7/2003 | Ho et al. ..................... | 351/177 |
| 6,631,988 B1 | 10/2003 | Shirayanagi et al. ........ | 351/177 |
| 6,789,985 B1 | 9/2004 | Shirayanagi ................. | 351/159 |
| 6,796,653 B1 * | 9/2004 | Shirayanagi ................. | 351/159 |
| 2002/0039171 A1 * | 4/2002 | Shtrayanagi et al. ........ | 351/159 |

FOREIGN PATENT DOCUMENTS

| JP | 3236263 | 9/2001 |
|---|---|---|
| WO | 93/07525 | 4/1993 |

OTHER PUBLICATIONS

U.S. Appl. No. 10/790,541, filed on Mar. 2, 2004, to Shirayanagi.

* cited by examiner

*Primary Examiner*—Scott J. Sugarman
*Assistant Examiner*—Darryl J. Collins
(74) *Attorney, Agent, or Firm*—Greenblum & Bernstein, P.L.C.

(57) ABSTRACT

A method of designing a spectacle lens having a front surface and a back surface is provided. At least one of the front and back surfaces is formed as a rotationally asymmetrical aspherical surface. The method includes the steps of selecting a plurality of cross-sections of the spectacle lens respectively defined in a plurality of planes each of which includes a reference axis passing through the front and back surfaces at a point substantially equal to a center of an outer diameter of the spectacle lens, each of the plurality of cross-sections having one side coinciding with the reference axis, designing each of shapes of the plurality of cross-sections so that predetermined optical performance is optimized for each of the shapes of the plurality of cross-sections, and interpolating a characteristic amount regarding intermediate points on the rotationally asymmetrical aspherical surface between the shapes of the plurality of cross-sections using a characteristic amount of each of the shapes of the plurality of cross-sections.

20 Claims, 30 Drawing Sheets

— $\theta=0,\pi$
--- $\theta=\pi/4, 3\pi/4,$
   $5\pi/4, 7\pi/4,$
..... $\theta=\pi/2, 3\pi/2$ — $\theta=0,\pi$
--- $\theta=\pi/4, 3\pi/4,$
   $5\pi/4, 7\pi/4,$
..... $\theta=\pi/2, 3\pi/2$

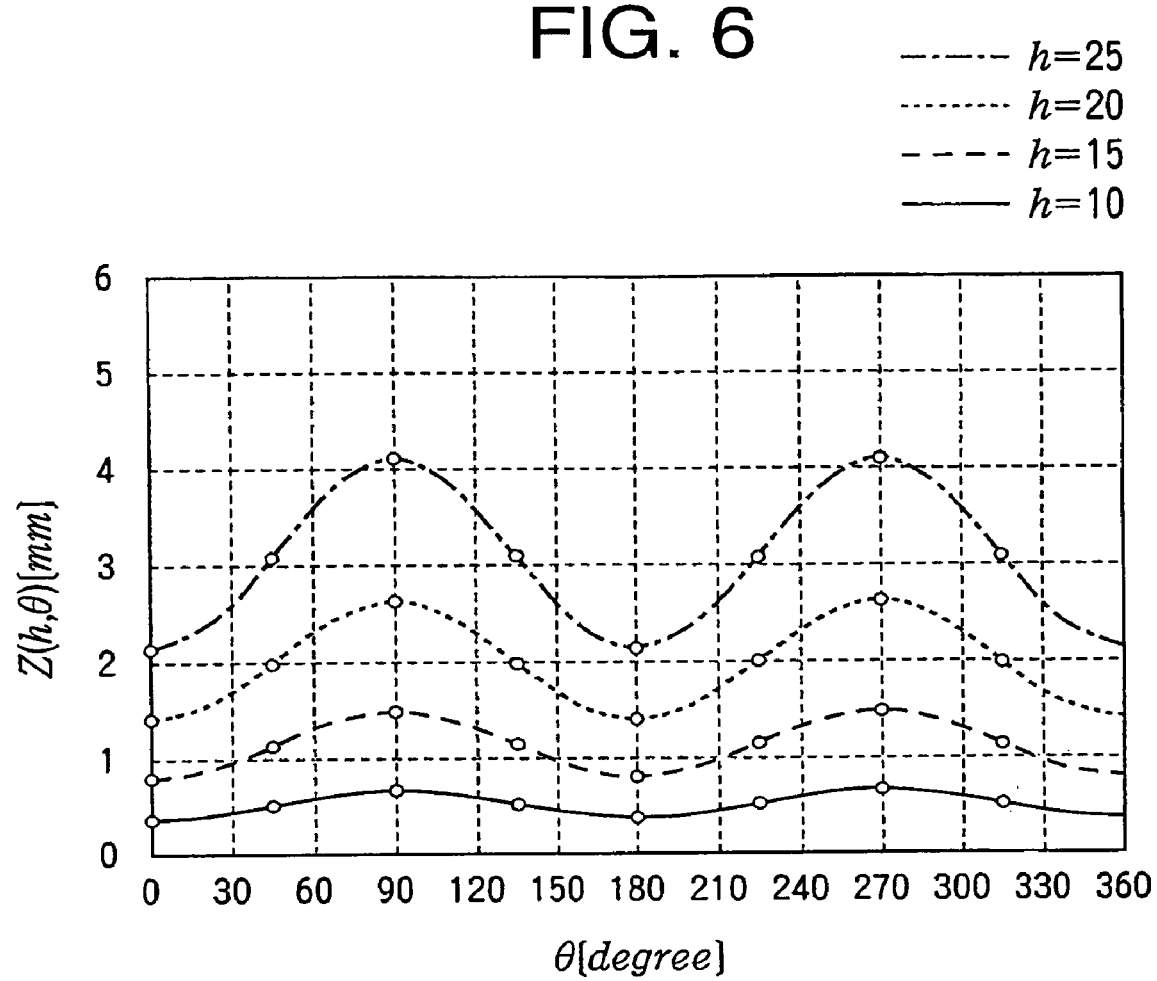

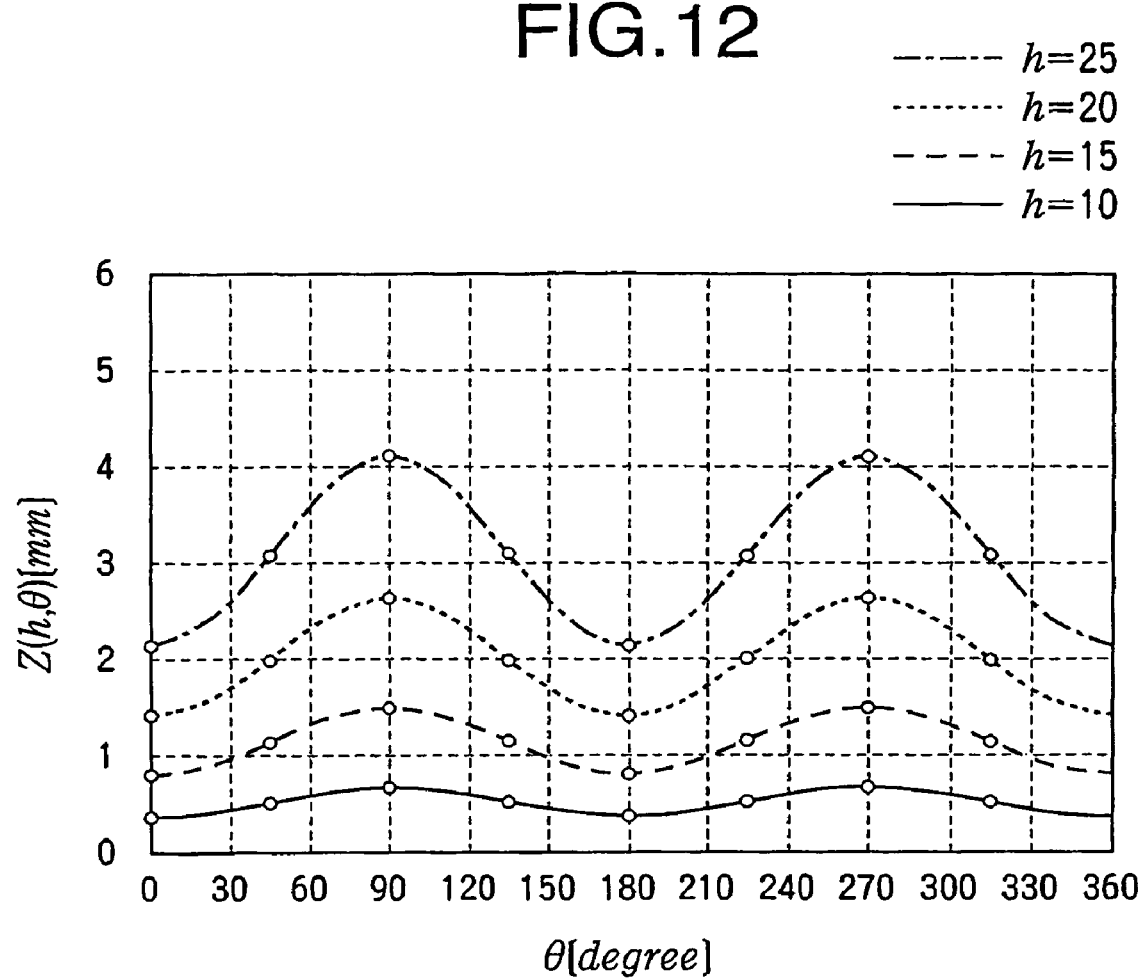

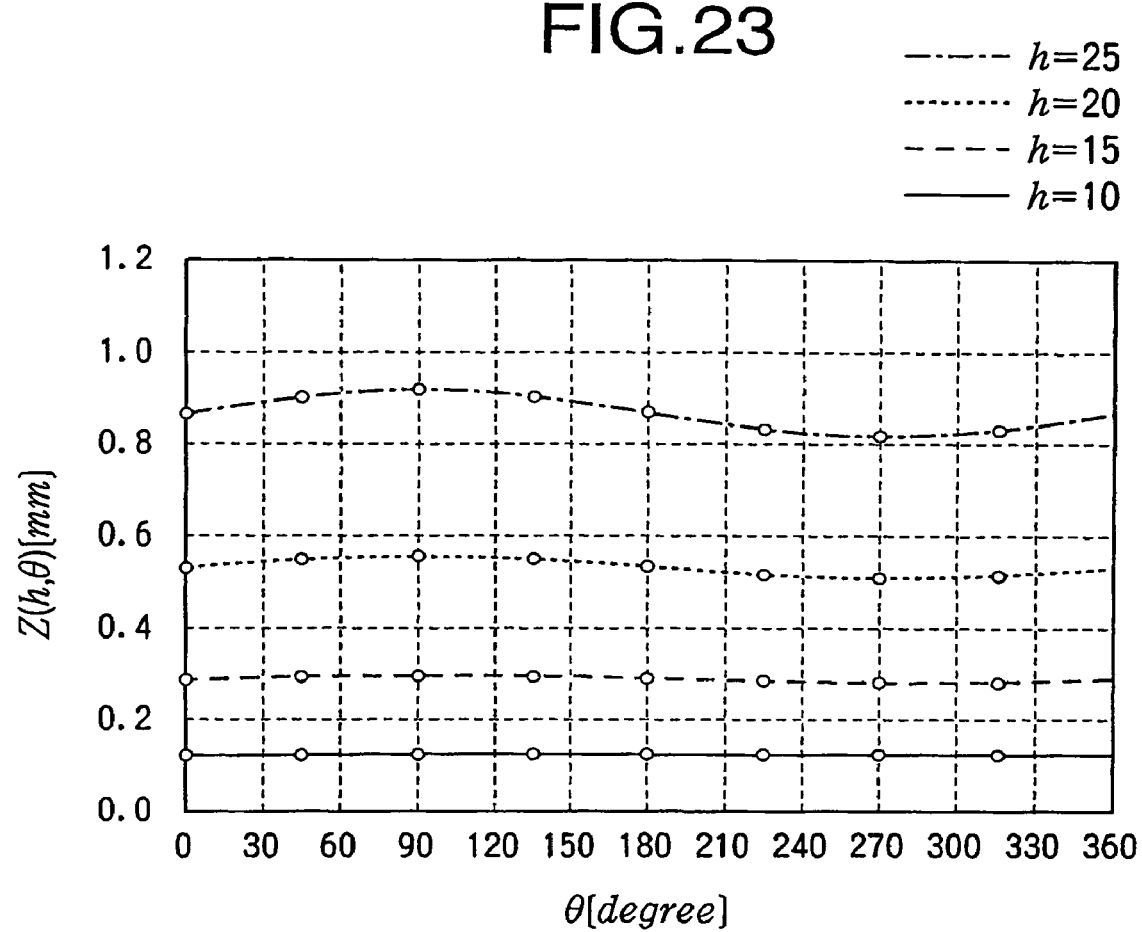

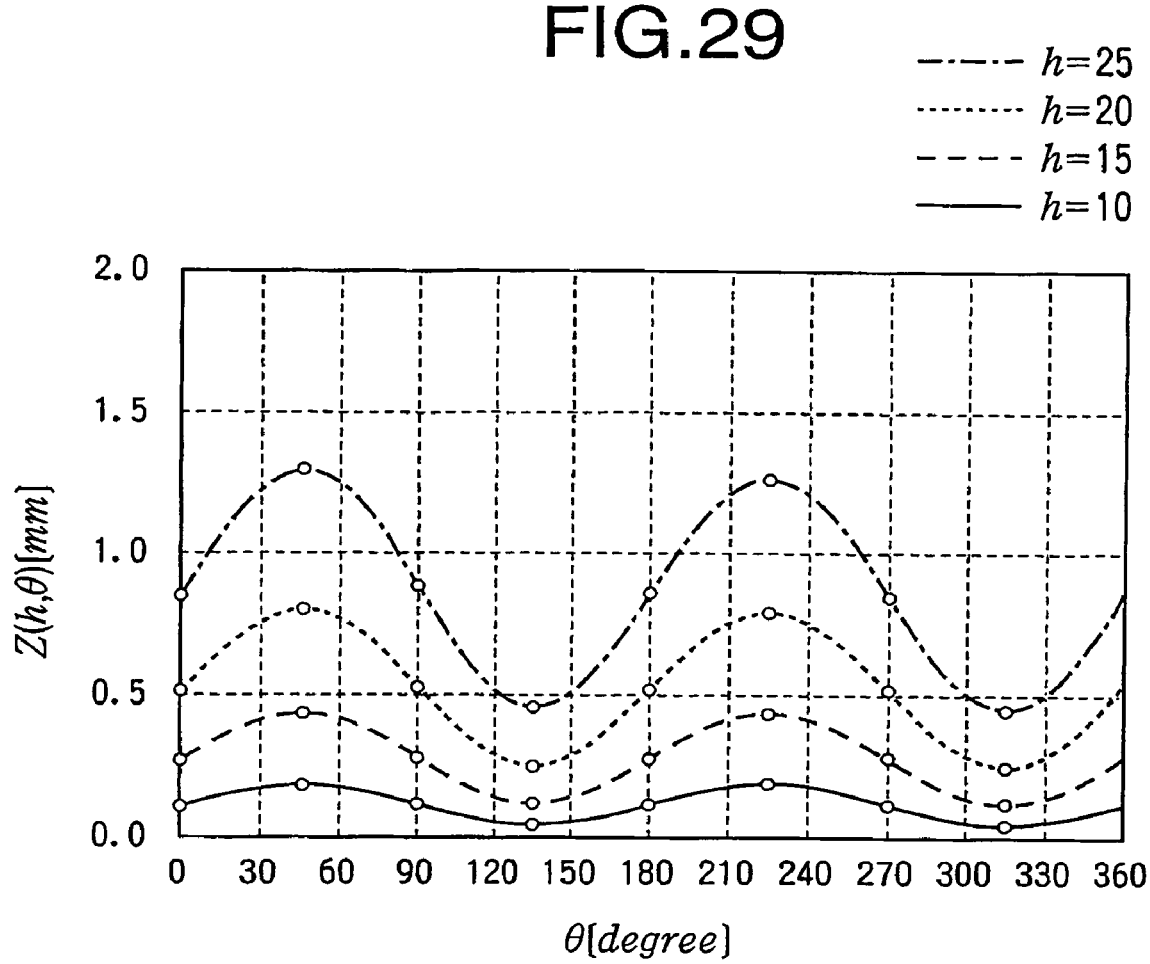

FIG.40

| | FIRST EXAMPLE | SECOND EXAMPLE | THIRD EXAMPLE |
|---|---|---|---|
| SPHERICAL POWER SPH [D] | −4.00 | −4.00 | −4.00 |
| CYLINDRICAL POWER CYL [D] | −4.00 | −4.00 | −4.00 |
| CYLINDER AXIS AX [°] | 180 | 180 | 180 |
| PRISMATIC POWER PRISM[$\Delta$] | 0.00 | 0.00 | 0.00 |
| PRISM BASE SETTING BASE [°] | − | − | − |
| FRONT SURFACE | SPHERICAL | SPHERICAL | SPHERICAL |
| BACK SURFACE | ASPHERICAL | ASPHERICAL | ASPHERICAL |
| FRONT SURFACE PARAXIAL CURVATURE C [Diopter] | 1.35 | 1.35 | 1.35 |
| BACK SURFACE PARAXIAL CURVATURE C [Diopter] | 7.36~13.38 | 7.36~13.38 | 7.36~13.38 |
| CENTER THICKNESS TC [mm] | 1.10 | 1.10 | 1.10 |
| OUTER DIAMETER DIA [mm] | 70 | 70 | 70 |
| REFRACTIVE INDEX N | 1.67 | 1.67 | 1.67 |
| NUMBER OF CROSS SECTIONAL SHAPES (NUMBER OF TARGET SHAPES) | 8(3) | 4(2) | 4(2) |
| EVALUATION TARGET ABERRATION (OBJECT DISTANCE) | AP(−500) | AP(−500) | DM(−1500) |
| CHARACTERISTIC AMOUNT | SAG | SAG | CROSS SECTION CURVATURE |
| EQUATION USED FOR INTERPOLATION | EQUATION(1) | EQUATION(2) | EQUATION(1) |
| | FOURTH EXAMPLE | FIFTH EXAMPLE | SIXTH EXAMPLE |
| SPHERICAL POWER SPH [D] | −4.00 | 4.00 | 4.00 |
| CYLINDRICAL POWER CYL [D] | 0.00 | 2.00 | 0.00 |
| CYLINDER AXIS AX [°] | − | 45 | − |
| PRISMATIC POWER PRISM[$\Delta$] | 3.00 | 3.00 | 0.00 |
| PRISM BASE SETTING BASE [°] | 270 | 90 | − |
| FRONT SURFACE | ASPHERICAL | SPHERICAL | SPHERICAL |
| BACK SURFACE | SPHERICAL | ASPHERICAL | ASPHERICAL |
| FRONT SURFACE PARAXIAL CURVATURE C [Diopter] | 2.44 | 9.52 | 6.96 |
| BACK SURFACE PARAXIAL CURVATURE C [Diopter] | 8.45 | 0.77~3.77 | 1.03 |
| CENTER THICKNESS TC [mm] | 1.10 | 7.03 | 4.34 |
| OUTER DIAMETER DIA [mm] | 70 | 70 | 70 |
| REFRACTIVE INDEX N | 1.67 | 1.67 | 1.67 |
| NUMBER OF CROSS SECTIONAL SHAPES (NUMBER OF TARGET SHAPES) | 8(5) | 8(7) | 8(5) |
| EVALUATION TARGET ABERRATION (OBJECT DISTANCE) | AP($\infty$) | AP($\infty$) | AP($\infty$)−AS(−250) |
| CHARACTERISTIC AMOUNT | SAG | SAG | SAG |
| EQUATION USED FOR INTERPOLATION | EQUATION(1) | EQUATION(1) | EQUATION(1) |

FIG.41

METHOD OF DESIGNING ASPHERICAL SPECTACLE LENS

INCORPORATION BY REFERENCE

This application claims priority of Japanese Patent Application No. 2004-205235, filed on Jul. 12, 2004, the entire subject matter of the application being incorporated herein by reference.

BACKGROUND OF THE INVENTION

The present invention relates to a method of designing a corrective lens, particularly to an aspherical spectacle lens provided with a rotationally asymmetrical optical property, such as, a cylindrical power or a prismatic power.

Design methods for designing an aspherical spectacle lens provided with a cylindrical power have been proposed. Examples of such a design method are disclosed in International publication No. WO93/07525 and Japanese Patent publication NO. 3236263. As shown in the above mentioned publications, the conventional design method requires the use of very complicated equations regarding an aspherical surface to be designed and the use of a number of parameters. Therefore, it is very difficult for a designer to estimate an effect on optical performance resulting from changes of values of the parameters. For this reason, generally a computer-based automated design method by use of an optimization program is used for design of an aspherical spectacle lens.

However, such an optimization program requires matrix calculation having at least the size defined by (the number of parameters)×(the number of aberrations to be evaluated). Therefore, the processing time and the program size of the optimization program increase with the increase of the number of parameters. The term "aberrations to be evaluated" means aberrations to be corrected in the process of the automated design program in which target values of the aberrations are established and the evaluated values approach the target values. In addition, the larger the number of parameters becomes, the larger a possibility that the optimization program tends to be brought to a state of a local minimum becomes. There is a possibility that the optimization program can not reach true optimum values.

Furthermore, the use of the optimization program requires a designer to establish target values of the aberrations in accordance with specifications of a lens to be designed. Therefore, whether or not the target values reach true optimum values depends on the judgment of the designer. In particular, if the lens to be designed is a rotationally asymmetrical lens, a designer is required to be considerably careful about the judgment.

Furthermore, there is a possibility that a result of automated design varies among designers who address the automated design for lenses having the same optical performance.

Furthermore, a design method suitable for designing an aspherical spectacle lens having a prismatic power has not been proposed. Conventionally, such a lens is designed in such a manner that a first surface and a second surface of an aspherical lens, which was designed not to have a cylindrical power, are inclined with respect to each other so as to provide a prismatic power for the aspherical spectacle lens. If such a design manner is used, the occurrence of aberrations is unavoidable.

SUMMARY OF THE INVENTION

The present invention is advantageous in that it provides a method of designing an aspherical lens provided with a power having asymmetricity about an optical axis of the lens, such as, a cylindrical power or a prismatic power, for enabling a designer to bring aberrations to be evaluated to target values without requiring a complicated design process and to attain suitable optical performance while reducing the burden on the designer in the design process.

According to an aspect of the invention, there is provided a method of designing a spectacle lens having a front surface and a back surface. At least one of the front and back surfaces is formed as a rotationally asymmetrical aspherical surface. The method includes the steps of selecting a plurality of cross-sections of the spectacle lens respectively defined in a plurality of planes each of which includes a reference axis passing through the front and back surfaces at a point substantially equal to a center of an outer diameter of the spectacle lens, each of the plurality of cross-sections having one side coinciding with the reference axis, designing each of shapes of the plurality of cross-sections so that predetermined optical performance is optimized for each of the shapes of the plurality of cross-sections, and interpolating a characteristic amount regarding intermediate points on the rotationally asymmetrical aspherical surface between the shapes of the plurality of cross-sections using a characteristic amount of each of the shapes of the plurality of cross-sections.

With this configuration, it is possible to design a spectacle lens having an rotationally asymmetrical aspherica surface such that excellent optical performance is attained without requiring a designer to perform a complicated designed process regardless of whether the spectacle lens has an asymmetric power property such as a cylindrical power and a prismatic power.

Optionally, the characteristic amount may relate to an aspherical surface shape.

Still optionally, the predetermined optical performance may includes a predetermined aberration. In the step of the designing, the each of the shapes of the plurality of cross-sections may be designed such that the predetermined aberration reaches substantially zero.

Still optionally, the characteristic amount regarding intermediate points on the rotationally asymmetrical aspherical surface may include a sag amount of the rotationally asymmetrical aspherical surface. In this case, the characteristic-amount of each of the shapes of the selected plurality of cross-sections may include a sag amount of each of the shapes of the plurality of cross-sections.

Still optionally, the characteristic amount regarding intermediate points on the rotationally asymmetrical aspherical surface may include curvatures of cross-sectional shapes of the rotationally asymmetrical aspherical surface. In this case, the characteristic amount of each of the shapes of the selected plurality of cross-sections may include a curvature of each of the shapes of the selected plurality of cross-sections.

Still optionally, the characteristic amount regarding intermediate points on the rotationally asymmetrical aspherical surface may include second derivatives of cross-sectional shapes of the rotationally asymmetrical aspherical surface, and the characteristic amount of each of the shapes of the selected plurality of cross-sections may include a second derivative of each of the shapes of the selected plurality of cross-sections.

With regard to the above mentioned two types of methods in which the curvature or the second derivative are treated as the characteristic amounts, the method may include the step of determining a shape of the rotationally asymmetrical aspherical surface by integrating the characteristic amount regarding intermediate points on the rotationally asymmetrical aspherical surface interpolated by the step of the interpolating.

Still optionally, a number of a plurality of cross-sections selected in the step of the selecting may be more than four.

In a particular case, the plurality of cross-sections selected in the step of the selecting may include cross-sections having the same shape depending on a symmetric property that the spectacle lens has.

In a particular case, the number of a plurality of cross-sections selected in the step of the selecting may be eight.

Optionally, in the step of the selecting the plurality of cross-sections, the cross-sectional shapes may be defined in a polar coordinate system defined by a pole, which is an intersection point of the reference axis and the rotationally asymmetrical aspherical surface, and a plane with which the reference axis perpendicularly intersects, and the cross-sectional shapes may be selected for each of angles of deviation defined in accordance with an equation:

$$\theta j = 2\pi j/n \quad (1)$$

where n represents a number of cross-sections to be selected (n is an even number), and j represents a number of each cross-sectional shape (j=0 to n−1).

Still optionally, in the step of the interpolating, given that the characteristic amount of a j-th cross-section is fj(h), the characteristic amount regarding intermediate points on the rotationally asymmetrical aspherical f(h,θ) may be interpolated in a direction of an angle of deviation θ in accordance with an equation:

$$f(h, \theta) = \frac{\{A_0(h) + A_{n/2}(h) \cdot \cos(n\theta/2)\}}{2} + \sum_{k=1}^{n/2-1} \{A_k(h) \cdot \cos(k\theta) + B_k(h) \cdot \sin(k\theta)\} \quad (2)$$

where $$A_k(h) = 2/n \cdot \sum_{j=0}^{n-1} f_j(h) \cdot \cos(2\pi jk/n)$$

where $k = 0, 1, \ldots n/2$ $$B_k(h) = 2/n \cdot \sum_{j=0}^{n-1} f_j(h) \cdot \sin(2\pi jk/n)$$

where $k = 1, 2, \ldots n/2 - 1$

In a particular case, the spectacle lens to be designed may include a cylindrical power.

In a particular case, the spectacle lens to be designed may include a prismatic power.

In a particular case, the spectacle lens to be designed may have an aspheric amount which changes depending on a position on the spectacle lens.

In a particular case, the back surface of the spectacle lens may be formed to be the rotationally asymmetrical aspherical surface.

Optionally, the spectacle lens to be designed may have a cylindrical power. In this case, the plurality of cross-sections selected in the step of selecting may include a maximum refractive power cross-section and a minimum refractive power cross-section. In the step of the interpolating, the characteristic amount regarding intermediate points on the rotationally asymmetrical aspherical surface may be interpolated according to a non-sine-wave-like function using sag amounts of the maximum and minimum refractive power cross sections.

Still optionally, the maximum and minimum refractive power cross-sections may be defined in a polar coordinate system defined by a pole, which is an intersection point of the reference axis and the rotationally asymmetrical aspherical surface, and a plane with which the reference axis perpendicularly intersects. The maximum refractive power cross-section may be set at an angle of deviation θ of 0 and the minimum refractive power cross section may be set at an angle of deviation θ of π/2. In this case, the sag amount regarding intermediate points on the rotationally asymmetrical aspherical surface may be interpolated assigning a sag amount of the maximum refractive power cross-section and a sag amount of the minimum refractive power cross-section to the non-sine-wave-like function:

$$Z(h, \theta) = \frac{\{Z_a(h) + Z_b(h)\}}{2} + \frac{\{Z_a(h) - Z_b(h)\}}{2} \cdot \cos\{2\theta + \mu h \sin(2\theta)\} \quad (3)$$

where Za(h) represents the sag amount of the maximum refractive power cross-section, Zb(h) represents the sag amount of the minimum refractive power cross-section, μ is a coefficient representing a degree of change from a sine wave.

According to an aspect of the invention, there is provided a process of manufacturing a spectacle lens having a front surface and a back surface. At least one of the front and back surfaces is formed as a rotationally asymmetrical aspherical surface. The process may include the steps of determining which of a plurality of vertex power groups, which are defined by classifying vertex powers into a plurality of groups according to magnitude of the vertex powers, a vertex power of the spectacle lens to be designed belongs to, specifying an unprocessed lens belonging to a vertex power group, to which the spectacle lens to be designed belongs, from among a plurality of unprocessed lenses respectively corresponding to the plurality of vertex power groups, designing the spectacle lens using the method according to the above mentioned design method based on specifications of the spectacle lens, and processing the unprocessed lens specified in the step of the specifying in accordance with a design result of the step of the designing.

With this configuration, it is possible to produce a spectacle lens having an rotationally asymmetrical aspherica surface such that excellent optical performance is attained without requiring a designer to perform a complicated designed process regardless of whether the spectacle lens has an asymmetric power property such as a cylindrical power and a prismatic power.

BRIEF DESCRIPTION OF THE ACCOMPANYING DRAWINGS

FIG. 6 is a graph illustrating the sag amount of the aspherical surface obtained by the interpolation according to the first example with respect to an angle of deviation;

FIG. 12 is a graph illustrating the sag amount of the aspherical surface obtained by the interpolation according to the second example with respect to an angle of deviation;

FIG. 23 is a graph illustrating the sag amount of the aspherical surface obtained by the interpolation according to the fourth example with respect to an angle of deviation;

FIG. 29 is a graph illustrating the sag amount of the aspherical surface obtained by the interpolation according to the fifth example with respect to an angle of deviation;

FIG. 40 shows specifications of the aspherical spectacle lenses respectively designed according to the first to sixth examples; and FIG. 41 shows a table regarding the spectacle lens illustrating classification of vertex powers into a plurality of groups by magnitude of the vertex powers.

DETAILED DESCRIPTION OF THE EMBODIMENTS

Hereinafter, embodiments according to the invention are described with reference to the accompanying drawings.

Figure 1A:
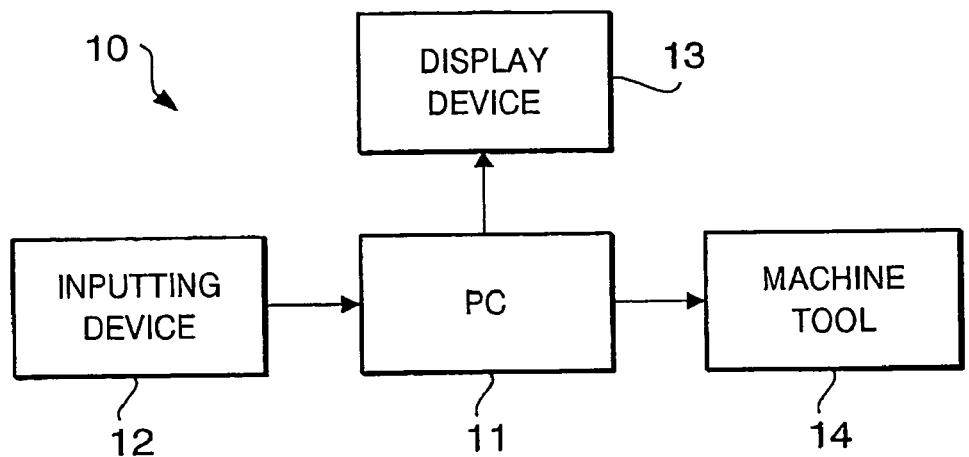
FIG. 1A is a block diagram illustrating a manufacturing system to which a manufacturing method according to an embodiment of the invention is applied.
Figure 1B:
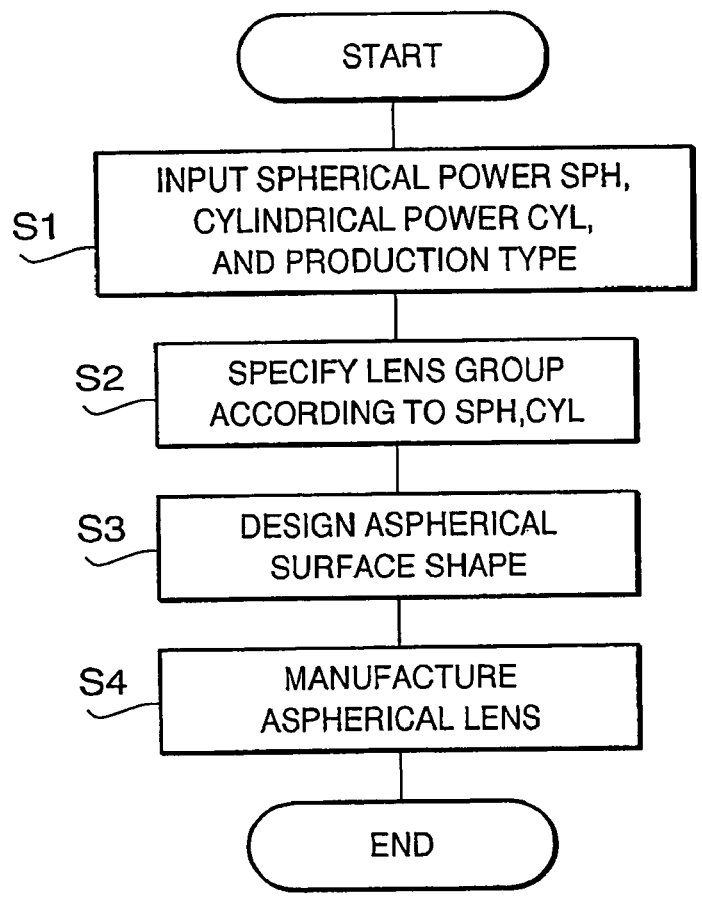
FIG. 1B is a flowchart illustrating the manufacturing method performed in the manufacturing system.

FIG. 1A is a block diagram illustrating a manufacturing system 10 to which a manufacturing method according to an embodiment of the invention is applied. FIG. 1B is a flowchart illustrating the manufacturing method performed in the manufacturing system 10. As shown in FIG. 1A, the manufacturing system 10 includes a PC (personal computer)

11, an inputting device 12, such as a keyboard, for inputting data to the PC 11, a display unit 13, such as a CRT, connected to the PC 11, and a machine tool 14 for processing an aspherical surface. Under control of the PC 11, a design method, which will be described in detail later, according to the embodiment is executed.

FIG. 1B is a flowchart illustrating the manufacturing method according to the embodiment. Spectacle lenses are manufactured according to the manufacturing method shown in FIG. 1B. First, an operator inputs specifications of a target spectacle lens to the PC 11 through use of the inputting device 12 (step S1). The specifications to be inputted to the PC 11 includes an optical property such as a vertex power (e.g., a spherical power and a cylindrical power), a direction of a cylinder axis AX, a prismatic power PRISM, and prism base setting BASE, and a product type.

Specifications of the target spectacle lens may be inputted to a terminal device located at a sales outlet for spectacle lenses and the inputted specifications may be transmitted from the terminal device to the manufacturing system through a network.

Figure 41:
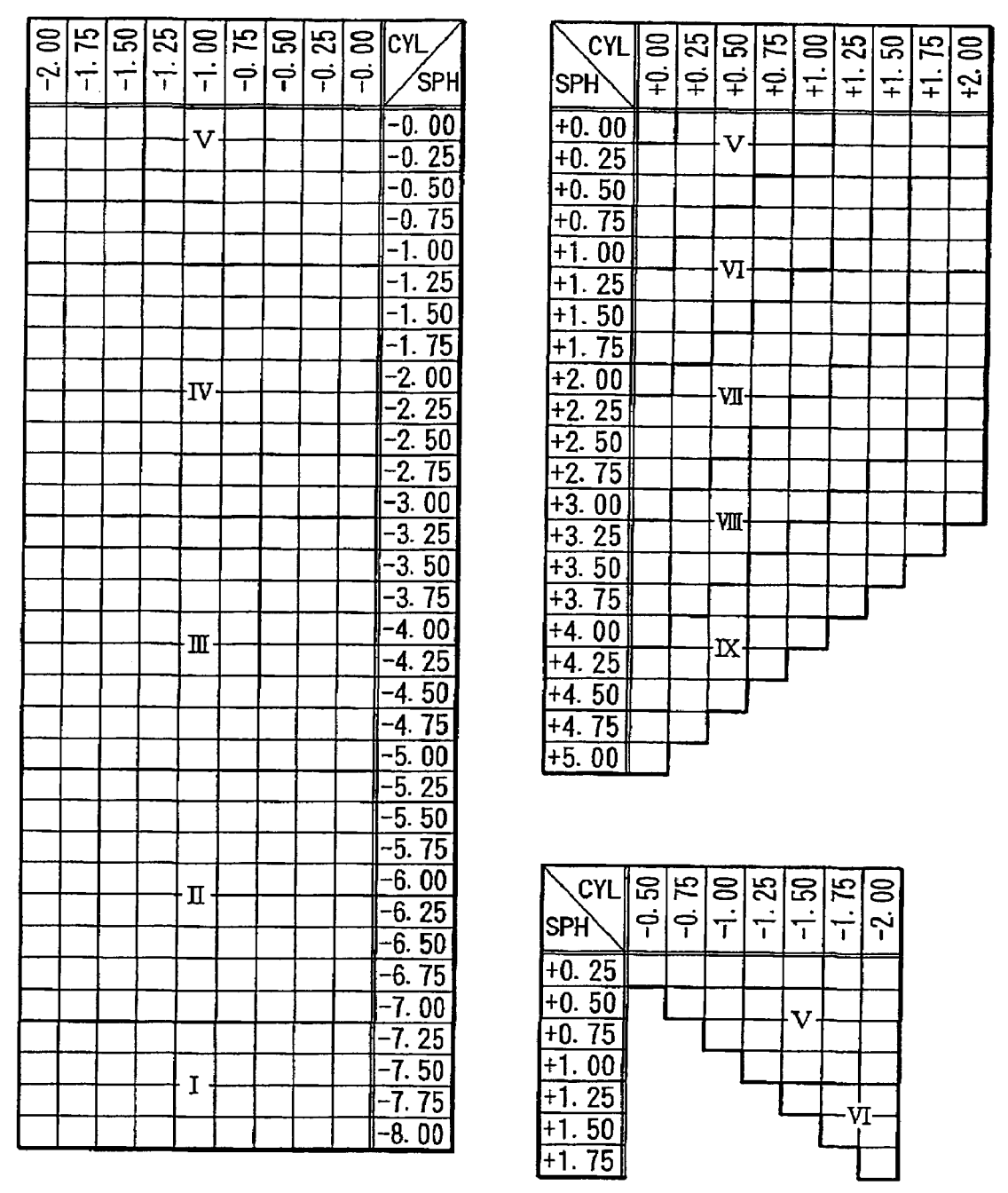

In the PC 11, a table regarding the vertex power as shown in FIG. 41 is inputted in advance. The table classifies spherical powers and cylindrical powers into nine groups I to IX according to the magnitude of these powers. In a manufacturing factory, a plurality of types of semi-finished lenses respectively corresponding to the nine groups are preliminary prepared. After the vertex power of the target spectacle lens is inputted to the PC 11, the PC 11 determines a group, to which the vertex power of the target spectacle lens belongs, using the table shown in FIG. 41 to specify a semi-finished lens (unprocessed lens) belonging to the group (step S2).

After the semi-finished lens is specified, automated design for designing surface shapes of the target spectacle lens is performed on the PC 11 based on the inputted specifications (step S3). The design method according to the embodiment is performed in step S3 as described in detail later. Information to be notified to the operator during the manufacturing process and information regarding a resign result are displayed on the display unit 13.

The operator puts the semi-finished lens specified by the PC 11 on the machine tool 14. If the operator inputs a start command to the PC 11 through use of the inputting device 12, the PC 11 controls and drives the machine tool 14, on which the semi-finished lens is placed, based on the design result including surface shape data designed by the PC 11 in step S3. The machine tool 14 operates to process (i.e., grind) the semi-finished lens under control of the PC 11 so that the target spectacle lens is manufactured (step S4).

Hereafter, the design method performed in step S3 will be described. The design method includes two processes of a cross-section design process and an interpolation process. In the design method, an axis, which passes through front and back surfaces of a semi-finished lens and coincides with an optical axis of a finished lens is defined as a reference axis Z. Based on the reference axis Z and a plane with which the reference axis Z perpendicularly intersects, a coordinate system is defined.

Next, four or more planes which include the reference axis Z and extend radially from the reference axis Z are selected and thereby cross-sectional shapes of the lens along the selected planes are selected. In this embodiment, the cross-sectional shape is selected for each of angles of deviation defined by an equation:

$$\theta j = 2\pi j/n \quad (1)$$

where n represents the number of planes to be selected, and j represents the number of each cross-sectional shape.

Next, for each of the selected cross-sectional shapes, the cross-sectional shape is designed so that aberrations to be evaluated approach target values. It should be noted that the selected cross-sectional shapes are designed independently. That is, when one of the selected cross-sectional shapes (a target cross-sectional shape) is designed, it is assumed that the entire lens shape is a rotationally symmetrical shape formed by the targeted cross-sectional shape. Therefore, the target value (e.g., a value of a target aberration) can be set to zero.

For designing each cross-sectional shape, a following equation defining a sag amout of an aspherical surface and an algorithm such as an attenuation least square method are used.

The equation representing an aspherical surface is as follows.

$$Z(h) = \frac{C \cdot h^2}{1 + \{1 - C^2 \cdot h^2 \cdot (\kappa + 1)\}^{1/2}} + A_{04} \cdot h^4 + A_{06} \cdot h^6 + A_{08} \cdot h^8 + A_{10} \cdot h^{10} \quad (4)$$

where, Z(h) represents a sag amount which is a distance between a point on the aspherical surface at a height of h from the optical axis and a plane tangential to the aspherical surface at the optical axis, symbol C represents a curvature (1/r) on the optical axis (hereafter, frequently referred to as a paraxial curvature), $\kappa$ is a conical coefficient, and $A_4$, $A_6$, $A_8$, and $A_{10}$ are aspherical coefficients of fourth, sixth, eighth, and tenth orders, respectively.

The paraxial curvature C may be a fixed value or may be determined by bending to obtain a predetermined dioptric power. Since $\kappa$ depends strongly on the high order aspherical coefficients, $\kappa$ may be a fixed value. Therefore, parameters to be optimized for the correction of aberrations are only the four high order aspherical coefficients $A_4$, $A_6$, $A_8$, and $A_{10}$.

After the design of all of the selected cross-sectional shapes is finished, by using characteristic amounts of each aspherical surface obtained from each of the designed cross-sectional shapes, intermediate points between the designed cross-sectional shapes are interpolated. The term characteristic amount of an aspherical surface as used herein means a property for defining an aspherical lens surface shape, such as a sag amount, a curvature of a cross-section, and the second derivative of a cross sectional shape. In the interpolation process, the intermediate points are determined so that the characteristic amounts at points on an intermediate region changes smoothly between the cross-sectional shapes.

Specifically, the interpolation process is performed as follows. First, an arbitrary point in the above mentioned coordinate system is represented by a radial height h and an angle of deviation $\theta$ (i.e., the arbitrary point is represented by a polar system). Given that the characteristic amount of an aspherical surface derived from a j-th cross-sectional shape is ij(h), the characteristic amount f(h,$\theta$) at an arbitrary point (h,$\theta$) is represented by an equation:

$$f(h, \theta) = \frac{\{A_0(h) + A_{n/2}(h) \cdot \cos(n\theta/2)\}}{2} + \sum_{k=1}^{n/2-1} \{A_k(h) \cdot \cos(k\theta) + B_k(h) \cdot \sin(k\theta)\} \quad (2)$$

where, $$A_k(h) = 2/n \cdot \sum_{j=0}^{n-1} f_j(h) \cdot \cos(2\pi jk/n)$$

where $k = 0, 1, \ldots n/2$ $$B_k(h) = 2/n \cdot \sum_{j=0}^{n-1} f_j(h) \cdot \sin(2\pi jk/n)$$

where $k = 1, 2, \ldots n/2 - 1$

Consequently, the characteristic amounts of the intermediate points are interpolated in a direction of the angle θ. In the above equation, if eight cross-sectional shapes are selected, j takes values of 0 to 7.

If the characteristic amount fj(h) is the sag amount of an aspherical surface, the above equation (2) represents the entire shape of the aspherical surface. If the characteristic amount fj(h) is a curvature of the cross-sectional shape or the second derivative of the cross-sectional shape, the entire shape of the aspherical surface is obtained by integrating the interpolated f(h,θ) with respect to h.

If a spectacle lens which has an cylindrical power and does not have an astigmatic power is to be designed, another example of interpolation may be adopted. In this example, four cross-sectional shapes are selected. The selected cross-sectional shapes include a maximum refractive power cross-section and a minimum refractive power cross-section. In this case, if the aspherical surface shape is designed according to the equation (2), optical performance suitable for the correction of astigmatism can not be attained.

From symmetric property of a surface, the four cross-sectional shapes include two pairs of the maximum refractive power cross-section and minimum refractive power cross-section. In this case, two cross-sectional shapes (i.e., the maximum refractive power cross-section and minimum refractive power cross-section) are designed independently so that the aberrations reach the target values for each of the maximum and minimum cross-sections. Then, the sag amount of each aspherical surface is determined. Next, sag amounts of an arbitrary point on the apsherical surface is interpolated by assigning the sag amount of the maximum refractive power cross-section and the sag amount of the minimum refractive power cross-section to a non-sine-wave-like equation:

$$Z(h, \theta) = \frac{\{Z_a(h) + Z_b(h)\}}{2} + \frac{\{Z_a(h) - Z_b(h)\}}{2} \cdot \cos\{2\theta + \mu h \sin(2\theta)\} \quad (3)$$

where Za(h) represents the sag amount of the maximum refractive power cross-section, Zb(h) represents the sag amount of the minimum refractive power cross-section, μ is a coefficient representing a degree of change from a sine wave. It is understood that if zero is assigned to μ, the equation (3) becomes a sine-wave like equation regulated by a cosine.

By assigning values of Za(h) and Zb(h) to the equation (3), an arbitrary point on the aspherical surface is interpolated by the equation (3).

Hereafter, six examples regarding the design method executed in step S3 of FIG. 1B will be described.

FIRST EXAMPLE

A design example according to a first example of the embodiment will be described. In this design example, an unprocessed lens having specifications of spherical power SPH −4.00 (D;Diopter) and a cylindrical power CYL −4.00 (D:Diopter) is treated. The unprocessed lens has a back surface formed as a rotationally asymmetrical aspherical surface and a front surface formed as a spherical surface. By forming the back surface as a rotationally asymmetrical aspherical surface, an outward appearance of the lens becomes authentically pleasing and ease of processing is enhanced.

Figure 2:
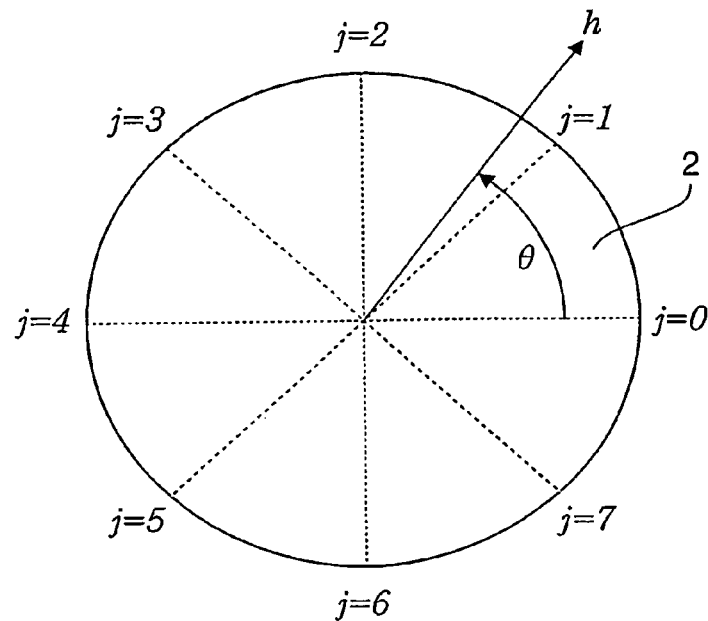
FIG. 2 is a front view illustrating a back surface of a rotationally asymmetrical sypherical spectacle lens designed according to a first example.
Figure 3:
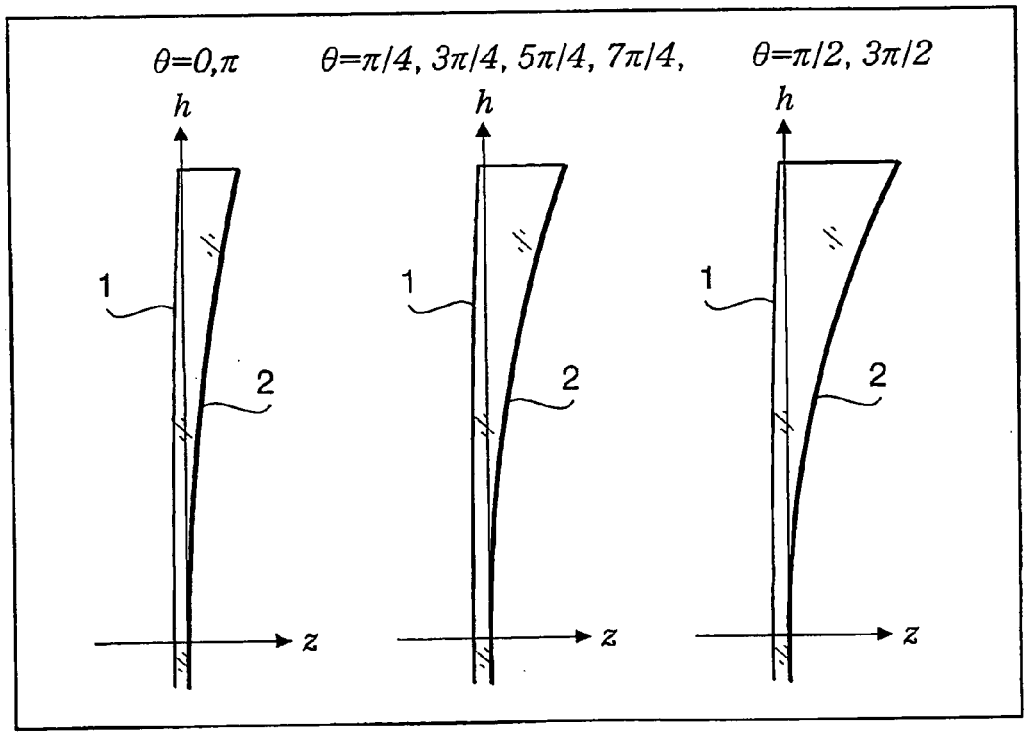
FIG. 3 shows cross-sectional shapes of the rotationally asymmetrical sypherical spectacle lens designed according to the first example.

FIG. 2 is a front view illustrating a back surface 2 of a rotationally asymmetrical sypherical spectacle lens. FIG. 3 shows cross-sectional shapes of the rotationally asymmetrical sypherical spectacle lens. In FIGS. 2 and 3 (and in the following similar drawings), an axis which passes through an optical center (which is also defined as a central pint of an outer diameter of the lens) of the lens and perpendicularly intersects with a back surface 2 (aspherical surface) is defined as a reference axis Z. In the following, an arbitrary point on the aspherical surface is represented by a polar coordinate defined by a pole, which is an intersection point of the reference axis Z and the aspherical surface, and a plane with which the reference axis Z perpendicularly intersects. Numerical references and representation of the polar coordinate used in this example are also applied to the following examples.

In this example, a cross-sectional shape of j=0 and θj=0 is given the dioptric power of −4.00. Further, seven cross sectional shapes (j=1 to 7) are selected in intervals of π/4. That is, the selected eight cross-sectional shapes have angles of deviation of 0, π/4, π/2, 3π/4, π, 5π/4, 3π/2, 7π/4 from j=0 to j=7. In view of a symmetric property that the spectacle lens has, the cross-sectional shapes of j=0 and j=4 have the same shape (hereafter, this cross-sectional shape is defined as a first cross-sectional shape). Also, the cross-sectional shapes of j=1, 3, 5 and 7 have the same shape (hereafter, this cross-sectional shape is defined as a second cross-sectional shape). The cross-sectional shapes of j=2 and j=6 have the same shape (hereafter, this cross-sectional shape is defined as a third cross-sectional shape). Therefore, in this example, the design for the aspherical spectacle lens (i.e., design of the cross-sectional shape and the interpolation) is performed in regard to only three different cross sectional shapes.

In the design process of the cross-sectional shapes, the first cross-sectional shape is assumed to be a cross-sectional shape of a lens having a spherical power of −4.00 [D] and not having a cylindrical power. Further, the second cross-sectional shape is assumed to be a cross-sectional shape of a lens having a spherical power of −6.00 [D] and not having a cylindrical power. Further, the third cross-sectional shape is assumed to be a cross-sectional shape of a lens having a spherical power of −8.00 [D] and not having a cylindrical power. As a target value, astigmatism at an object distance of −500 mm is set to zero [D].

For each of the first to third cross sectional shapes, the aspherical coefficients $A_4$, $A_6$, $A_8$, and $A_{10}$ of the equation (4) are optimized so that the target value is reached. It should be noted that the number of parameters used in the optimization according to this example is smaller than that used in a conventional optimization process, and the astigmatism can be brought to zero since the cross-sectional shapes are individually designed. Therefore, according to the first example, the design process is performed stably and effectively, and judgment of convergence in the optimization process can be automated.

Figure 4:
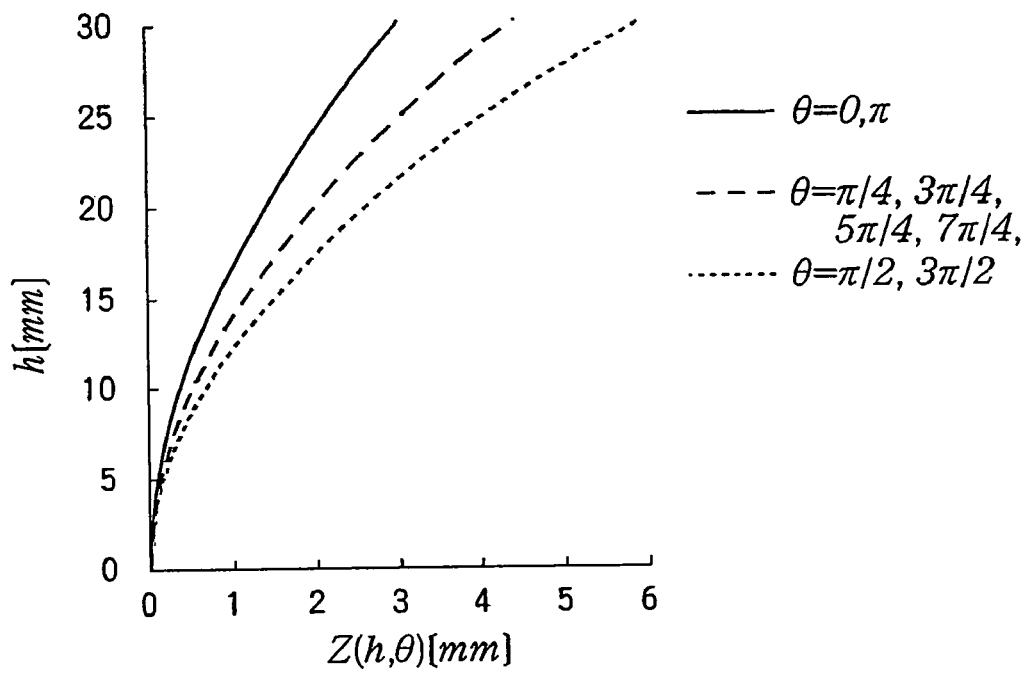
FIG. 4 is a graph illustrating the sag amount of the aspherical surface designed according to the first example with respect to a radial height.
Figure 5:
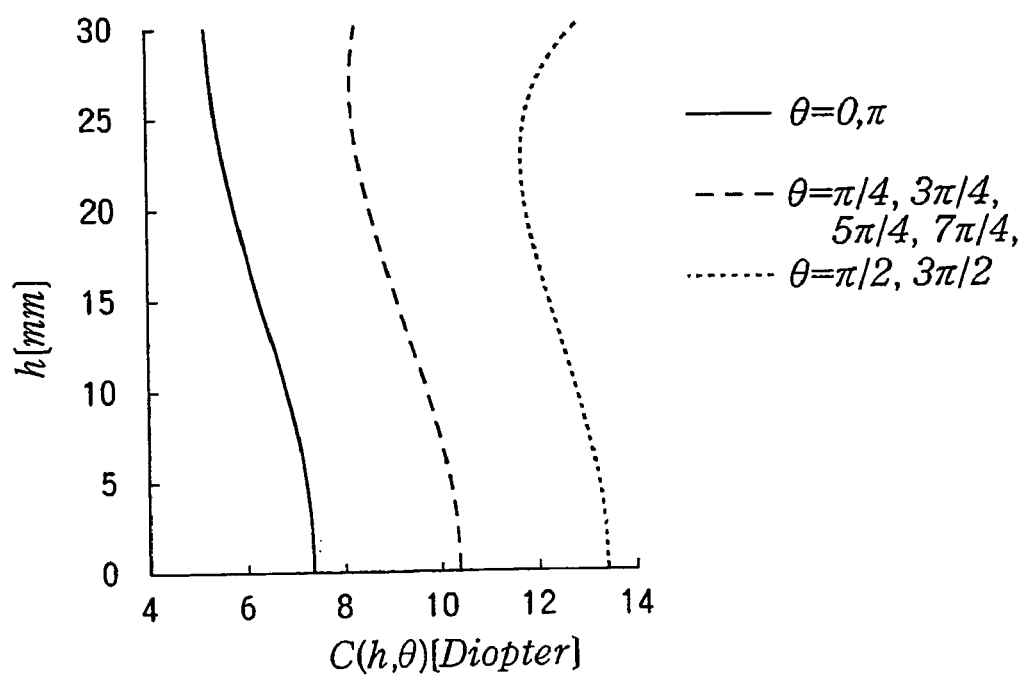
FIG. 5 is a graph illustrating the curvature of cross-sectional shapes of the aspherical surface designed according to the first example with respect to a radial height.

Values of the parameters as a result of the design of the cross-sectional shapes are shown in Table 1. FIG. 4 is a graph illustrating the sag amount $Z(h,\theta)$ [unit:mm] of the aspherical surface. FIG. 5 is a graph illustrating the curvature $C(h,\theta)$ [unit:diopter] of the cross-sectional shape of the aspherical surface. In Table 1 (and in the following similar Tables), a notation symbol E indicates that 10 is used as a radix and a right side value of E is used as an exponent.

TABLE 1

| j | θ | C | κ | $A_4$ | $A_6$ | $A_8$ | $A_{10}$ |
|---|---|---|---|---|---|---|---|
| 0 | 0 | 7.36 | 0.0 | −5.52E−07 | 2.56E−10 | −8.93E−14 | 1.57E−17 |
| 4 | 180 | | | | | | |
| 1 | 45 | 10.37 | 0.0 | −6.53E−07 | 3.04E−10 | −1.24E−13 | 3.31E−17 |
| 3 | 135 | | | | | | |
| 5 | 225 | | | | | | |
| 7 | 315 | | | | | | |
| 2 | 90 | 13.38 | 0.0 | −6.31E−07 | 2.85E−10 | −1.26E−13 | 6.10E−17 |
| 6 | 70 | | | | | | |

Next, using the sag amount $Z_j(h,\theta)$ which is obtained as above as a function of h for each cross-sectional shape, the entire shape of the aspherical surface is interpolated considering the equation (1). FIG. 6 is a graph illustrating the entire shape of the aspherical surface obtained by the interpolation for each of the heights h of 10, 15, 20 and 25 mm. In FIG. 6, white circles represent the sag amounts derived directly from the equation (4).

Figure 7A:
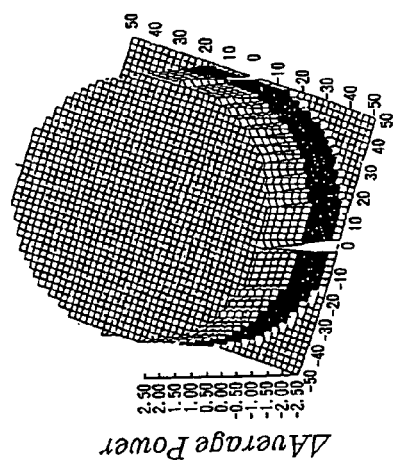
FIGS. 7A to 7F show evaluation results of optical performance of the aspherical surface obtained by the interpolation according to the first example.
Figure 7B:
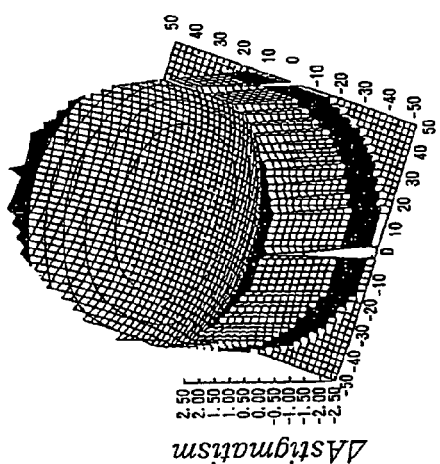
Figure 7C:
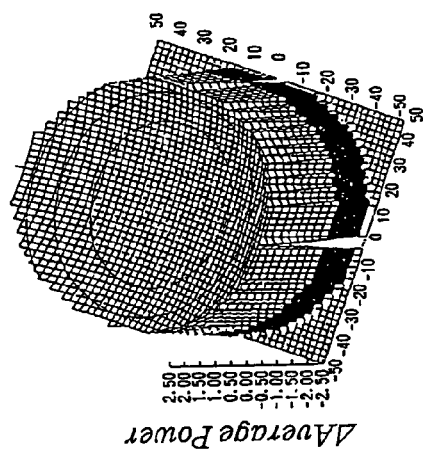
Figure 7D:
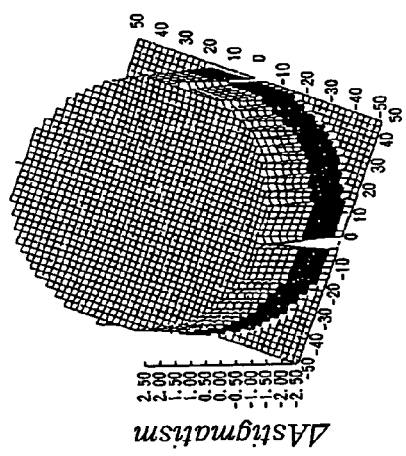
Figure 7E:
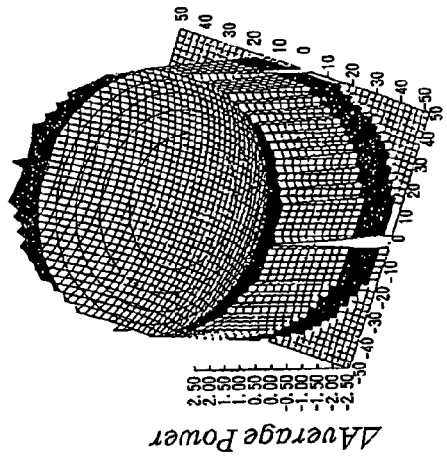
Figure 7F:
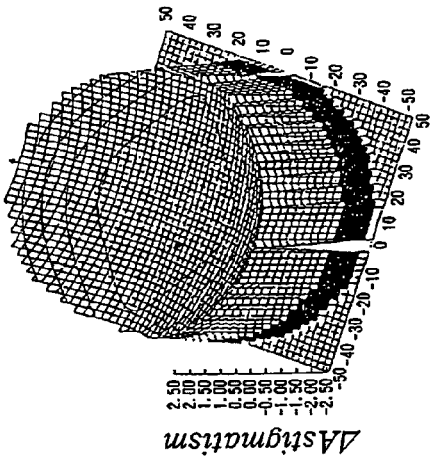

FIGS. 7A to 7F show evaluation results of optical performance of the aspherical surface obtained by the interpolation. FIGS. 7A and 7B are graphs illustrating an average refractive power error (ΔAverage Power) and astigmatism (ΔAstigmatism) at an object distance of infinity, respectively. FIGS. 7C and 7D are graphs illustrating the average refractive power error (ΔAverage Power) and the astigmatism (ΔAstigmatism) at an object distance of −500 mm, respectively. FIGS. 7E and 7F are graphs illustrating the average refractive power error (ΔAverage Power) and the astigmatism (ΔAstigmatism) at an object distance of −250 mm, respectively. In each of FIGS. 7A to 7F, lateral and longitudinal axes represent rotation angles of an eye in horizontal and vertical direction, respectively, and a height in an altitudinal direction represent the amount of aberration. The amount of aberration is represented by contour lines drawn by intervals of 0.25 [D]. Such representation of the graphs is also applied to the following similar graphs.

As shown in FIG. 7D, the asperical surface obtained by the above mentioned interpolation attains optical performance substantially same as that of each cross-sectional shape which is designed to have zero astigmatism at an object distance of 500 mm.

SECOND EXAMPLE

A design example according to a second example of the embodiment will be described. In this design example, an unprocessed lens having specifications of spherical power SPH −4.00 (D:Diopter) and a cylindrical power CYL −4.00 (D:Diopter) is treated. The unprocessed lens has a back surface formed as a rotationally asymmetrical aspherical surface and a front surface formed as a spherical surface. In this example, four cross-sectional shapes, each of which has one end equal to the reference axis Z, are selected, and the sag amount is treated as the characteristic amount of an aspherical surface. Therefore, in this example, the equation (3) is used for interpolation. The second example is advantageous in that the calculation of the interpolation is simple in comparison with the interpolation in the first example.

Figure 8:
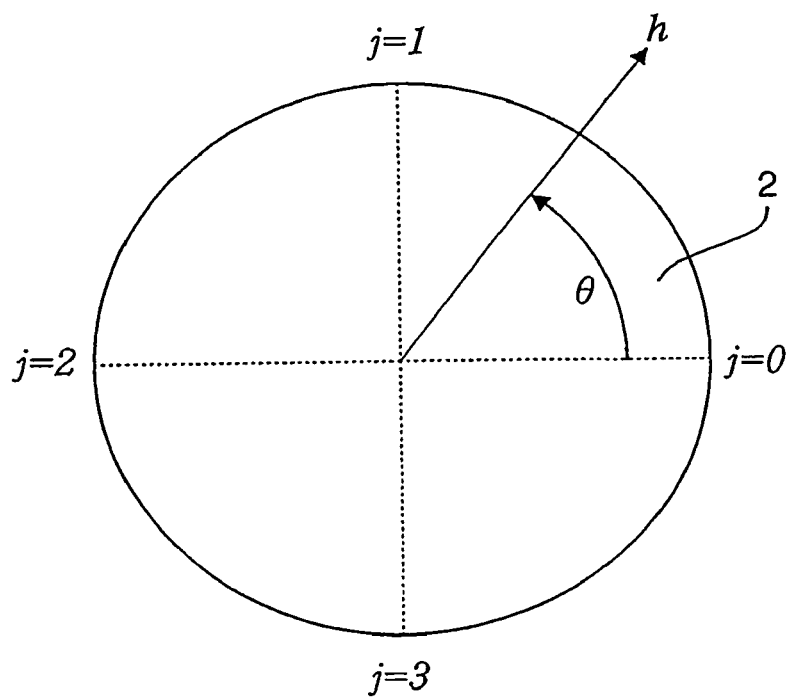
FIG. 8 is a front view illustrating a back surface of a rotationally asymmetrical sypherical spectacle lens designed according to a second example.
Figure 10:
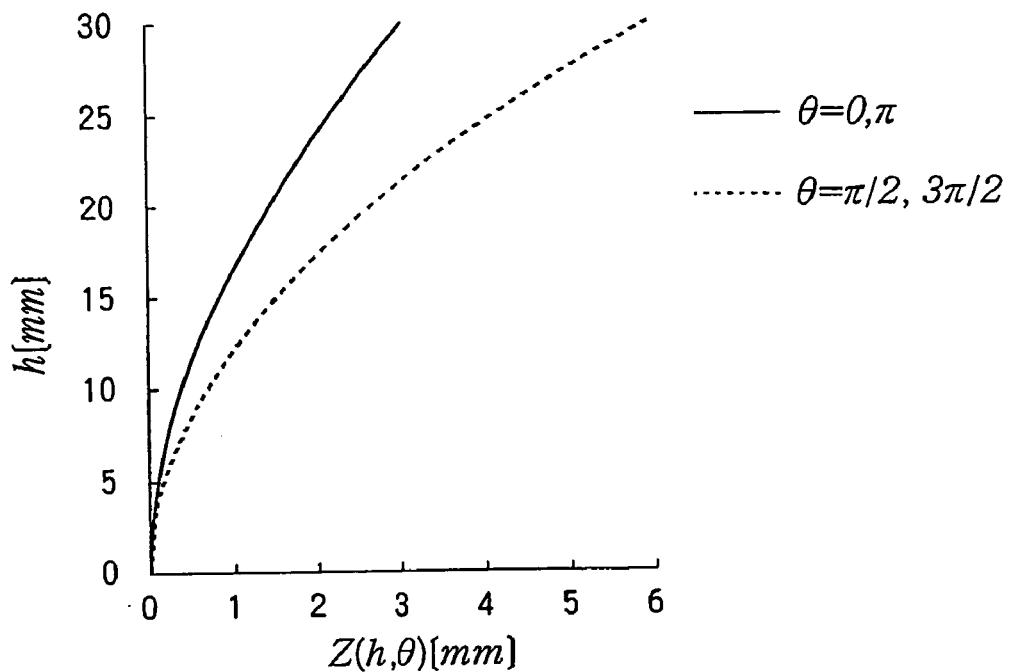
FIG. 10 is a graph illustrating the sag amount of cross sectional shapes optimized according to the second example with respect to a radial height.

FIG. 8 is a front view illustrating the back surface 2 of an asyperical spectacle lens according to the second example. FIG. 10 shows cross-sectional shapes of the aspherical spectacle lens.

In this example, a cross-sectional shape of j=0 and θj=0 is given the dioptric power of −4.00. Further, three cross sectional shapes (j=1 to 3) are selected in intervals of π/2. That is, the selected four cross-sectional shapes have angles of deviation of 0, π/2, π, and 3π/2 from j=0 to j=3. In this example, the cross-sectional shape of j=0 is the maximum refractive power cross-section, and the cross-sectional shape of j=1 is the minimum refractive power cross-section.

In view of a symmetric property of the surface, the cross-sectional shapes of j=0 and j=2 have the same shape (hereafter, this cross-sectional shape is defined as a first cross-sectional shape). Also, the cross-sectional shapes of j=1 and 3 have the same shape (hereafter, this cross-sectional shape is defined as a second cross-sectional shape). Therefore, in this example, the design for the aspherical spectacle lens (i.e., the design of the cross-sectional shape and the interpolation) is performed in regard to only two different cross sectional shapes.

In the design process of the cross-sectional shapes, the first cross-sectional shape is assumed to be a cross-sectional shape of a lens having a spherical power of −4.00 [D] and not having a cylindrical power. Further, the second cross-sectional shape is assumed to be a cross-sectional shape of a lens having a spherical power of −8.00 [D] and not having a cylindrical power. As a target value, astigmatism at an object distance of −500 mm is set to zero [D].

For each of the first and second cross sectional shapes, the aspherical coefficients $A_4$, $A_6$, $A_8$, and $A_{10}$ of the back surface represented by the equation (4) are optimized so that the target value is reached.

Figure 11:
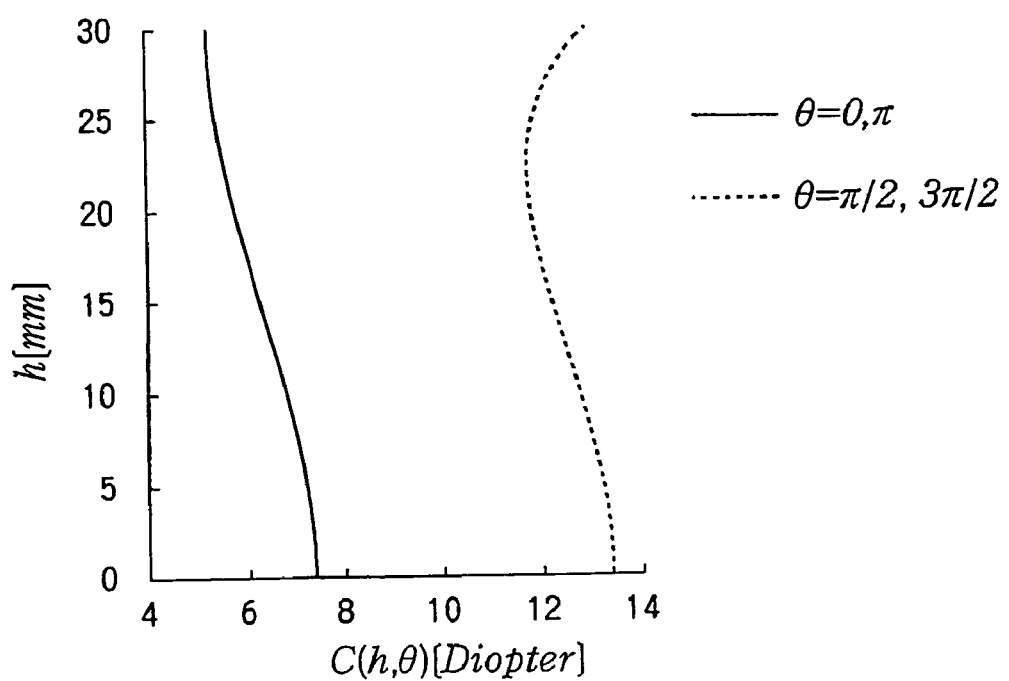
FIG. 11 is a graph illustrating the curvature of the cross-sectional shapes optimized according to the second example with respect to a radial height.

Values of the parameters as a result of the design of the cross-sectional shapes are shown in Table 2. FIG. 10 is a graph illustrating the sag amount of the aspherical surface. FIG. 11 is a graph illustrating the curvature of the cross-sectional shape of the aspherical surface.

TABLE 2

| j | θ | C | κ | $A_4$ | $A_6$ | $A_8$ | $A_{10}$ |
|---|---|---|---|---|---|---|---|
| 0 | 0 | 7.36 | 0.0 | −5.52E−07 | 2.56E−10 | −8.93E−14 | 1.57E−17 |
| 2 | 180 | | | | | | |
| 1 | 90 | 13.38 | 0.0 | −6.31E−07 | 2.85E−10 | −1.26E−13 | 6.10E−17 |
| 3 | 270 | | | | | | |

Next, using the sag amount Za(h) of the first cross-sectional shape and Zb(h) of the second cross-sectional shape obtained as described above, the entire shape of the aspherical surface is determined by the interpolation in the direction of the angle of deviation θ. In this example, μ in the equation (3) is set to −0.001. The inventor found that suitable design results can be obtained by setting a value of μ to satisfy a relationship:

$$CYL \times 3 \times 10^{-4} < \mu < CYL \times 10^{-4} \quad (5)$$

where CYL is a cylindrical power represented by a minus cylinder format.

FIG. 12 is a graph illustrating the entire shape of the aspherical surface obtained by the interpolation for each of the heights h of 10, 15, 20 and 25 mm. In FIG. 12, white circles represent the sag amounts derived directly from the equation (4).

Figure 13A:
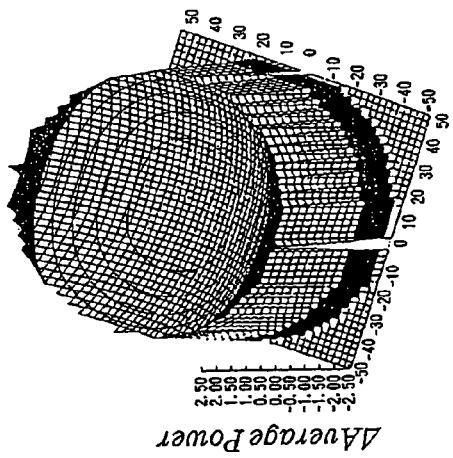
FIGS. 13A to 13F show evaluation results of optical performance of the spectacle lens according to the second example.
Figure 13B:
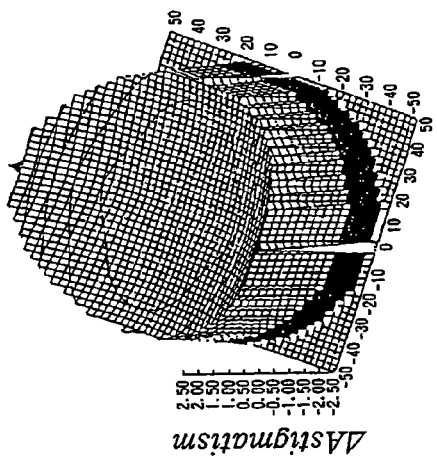
Figure 13C:
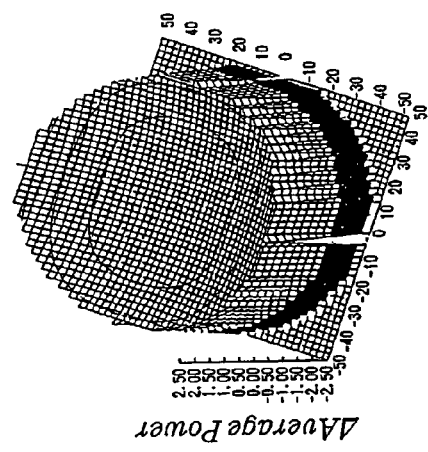
Figure 13D:
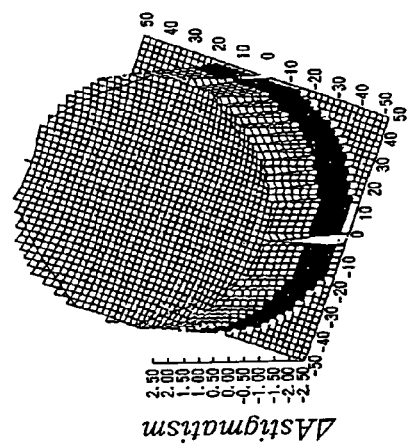
Figure 13E:
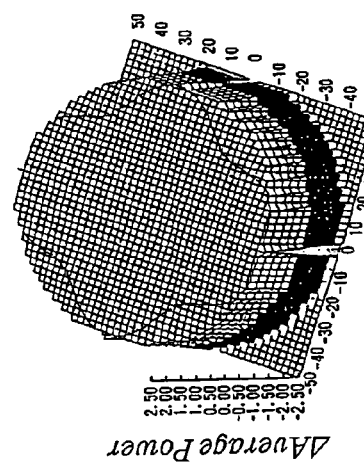
Figure 13F:
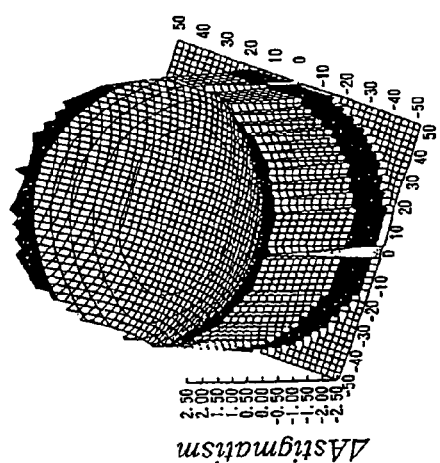

FIGS. 13A to 13F show evaluation results of optical performance of the aspherical surface obtained according to this design example. As shown in FIG. 13D, the asperical surface obtained by the above mentioned interpolation attains optical performance substantially same as that of each cross-sectional shape which is designed to have zero astigmatism at an object distance of 500 mm.

Figure 37:
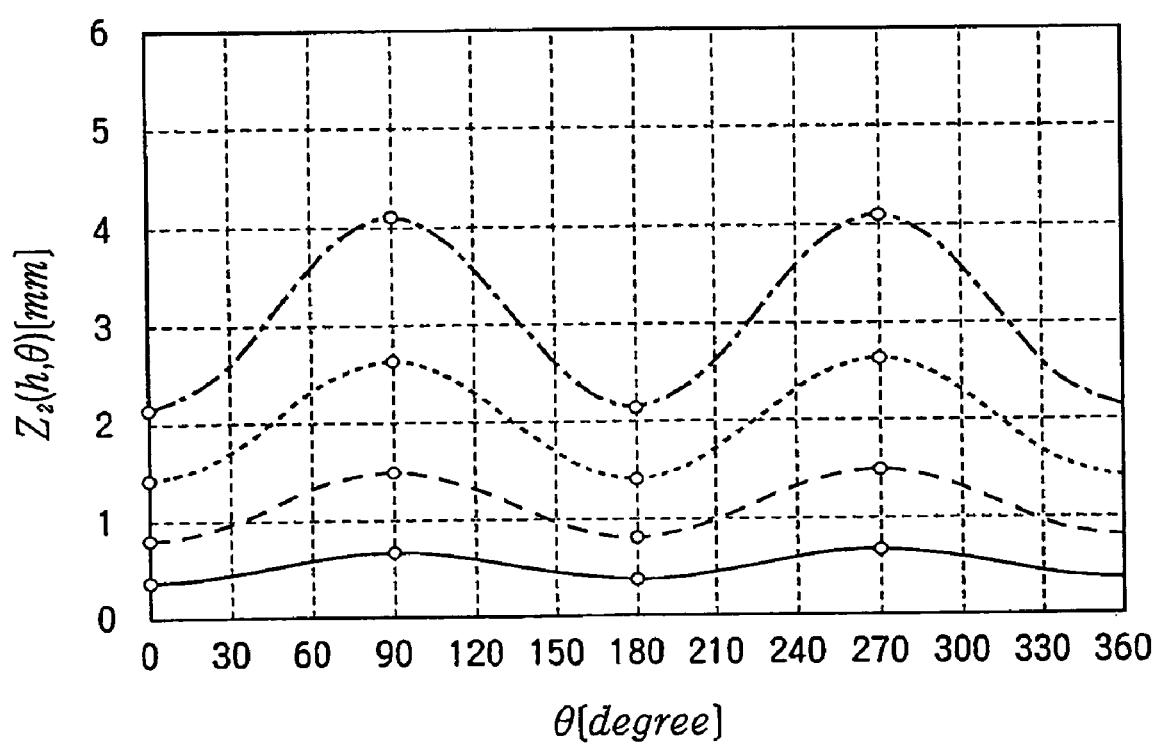
FIG. 37 is a graph illustrating the sag amount of an aspherical surface obtained by the interpolation according to a first comparative example with respect to an angle of deviation.
Figure 38A:
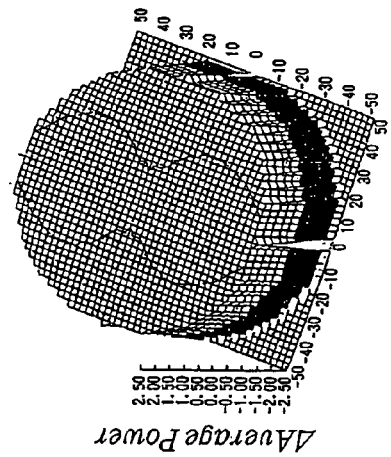
FIGS. 38A to 38F show evaluation results of optical performance of a spectacle lens according to the first comparative example.
Figure 38B:
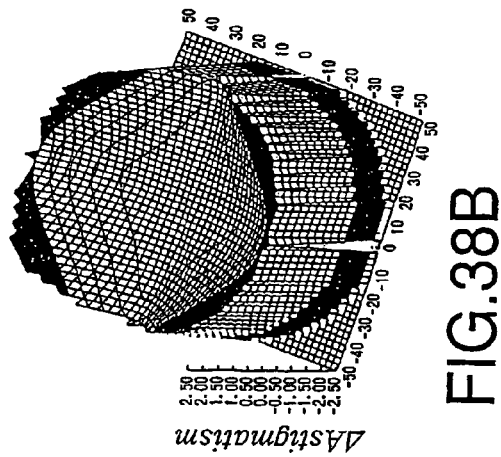
Figure 38C:
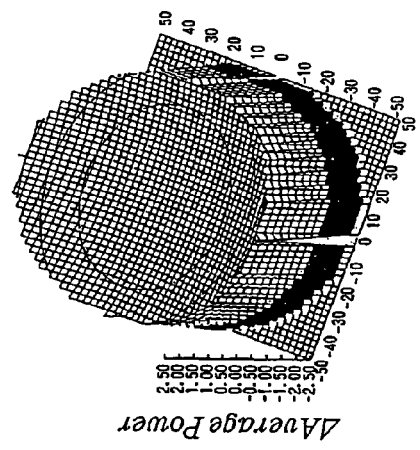
Figure 38D:
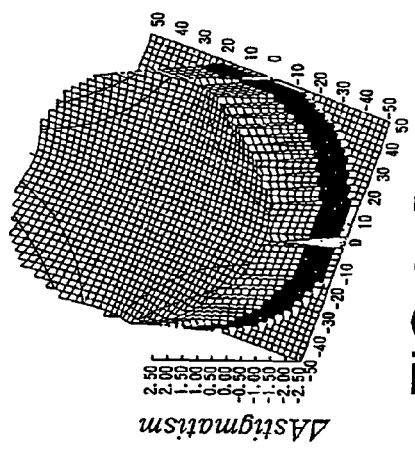
Figure 38E:
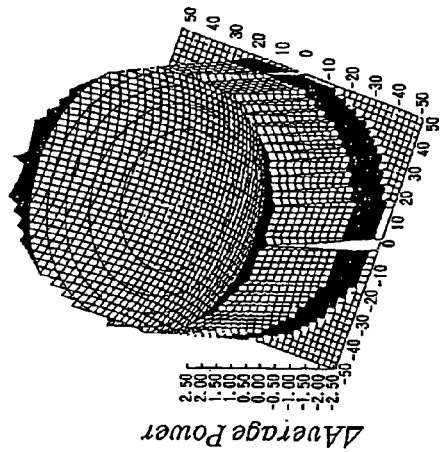
Figure 38F:
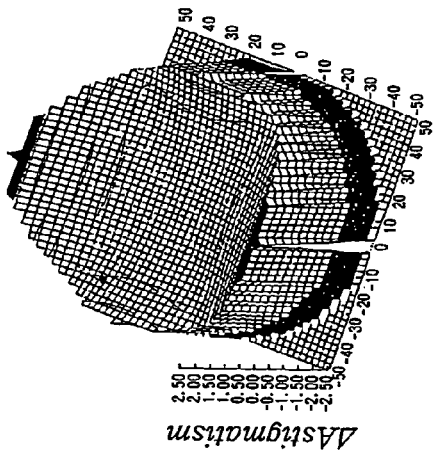
Figure 39E:
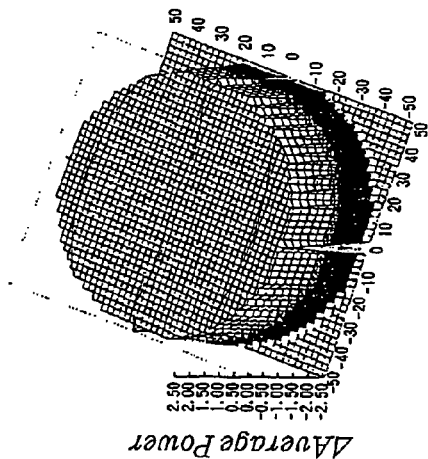
FIGS. 39A to 39F show evaluation results of optical performance of a spectacle lens according to a second comparative example.
Figure 39F:
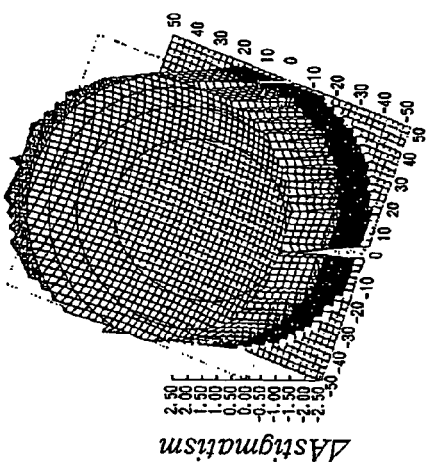
Figure 39C:
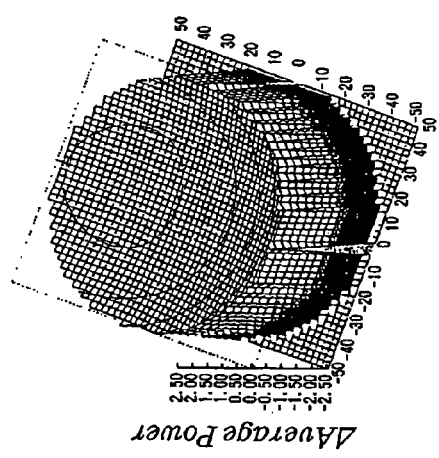
Figure 39D:
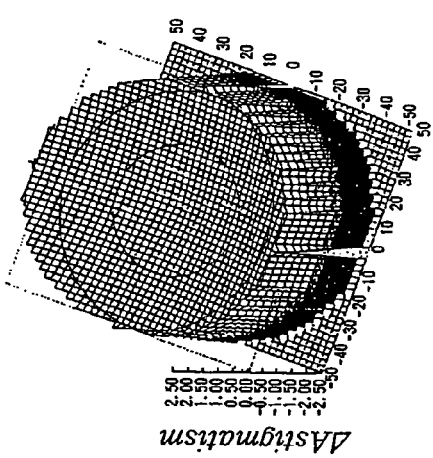
Figure 39A:
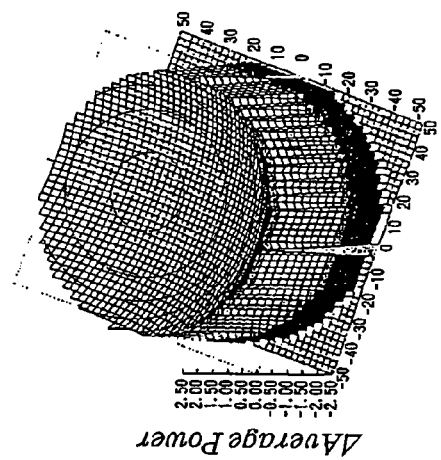
Figure 39B:
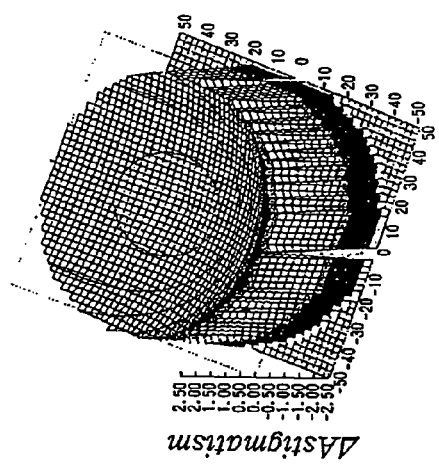

Consider a first comparative aspherical spectacle lens which is designed by using a sine-wave-like equation obtained by setting μ of the equation (2) to zero. FIG. 37 is a graph illustrating the entire shape of the aspherical surface according to the first comparative example obtained by the interpolation for each of the heights h of 10, 15, 20 and 25 mm. FIG. 38 shows an evaluation result of optical performance of the asperical spectacle lens according to the first comparative example.

The optimized cross-sectional shape of the first comparative example is the same as that of the second example. However, as shown in FIG. 37, the surface shape obtained by the interpolation according to the first comparative example is slightly different from the surface shape according to the second example.

Further, as shown in FIG. 38, the aspherical spectacle lens according to the first comparative example causes aberrations exceeding the maximum permissible level. In is understood by the above mentioned comparison that the aspherical spectacle lens according to the second example attains optical performance more excellent that that of the first comparative example.

THIRD EXAMPLE

A design example according to a third example of the embodiment will be described. In this design example, an unprocessed lens having the same refractive power as that of the second example (i.e., spherical power SPH −4.00 D and a cylindrical power CYL −4.00 D) is treated. The unprocessed lens has a back surface formed as a rotationally asymmetrical aspherical surface. Similarly to the second example, four cross-sectional shapes are selected. The four cross-sectional shapes are divided into two types including a first cross sectional shape having a refractive power of −4.00D and a second cross-sectional shape having a refractive power of −8.00D. The cross-sectional shapes of j=0 and j=2 belong to the first cross-sectional shape, and the cross-sectional shapes of j=1 and j=3 belong to the second cross-sectional shape.

Figure 9:
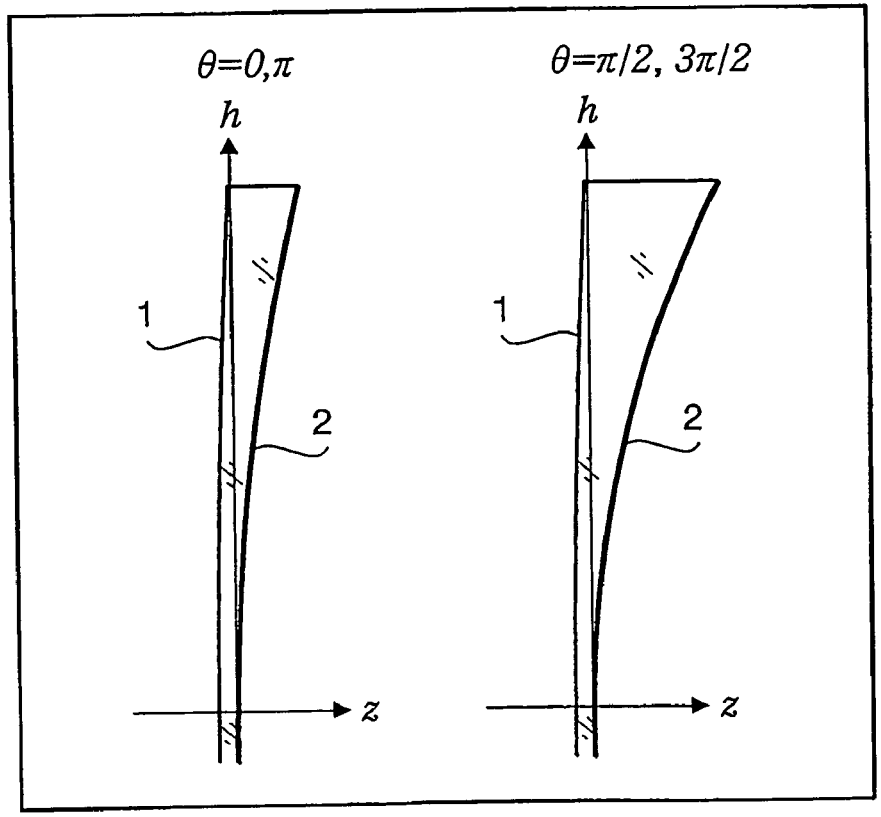
FIG. 9 shows cross-sectional shapes of the rotationally asymmetrical sypherical spectacle lens designed according to the first example.

As described below, in this example, the cross-sectional shape design and the interpolation are performed in a different way from the second example. A front view of the back surface of the aspherical spectacle lens according to the third example is also represented by FIG. 8. The cross-sectional shapes of the third example are substantially the same as those shown in FIG. 9. Therefore, explanations there of will not be repeated.

As a target value, a meridional refractive error an object distance of −1500 mm is set to zero [D]. In the above mentioned first and second examples, the astigmatism is treated as the target value. Therefore, in the first and second examples, it is required that both of the meridional and sagittal refractive power errors are calculated and a difference between the meridional and sagittal refractive power errors is determined.

By contrast, in the third example, only the meridional refractive error is treated as a target value. Therefore, according to the third example, a calculation time can be reduced to half of the calculation time of the first or second example.

For each of the first and second cross sectional shapes, the aspherical coefficients $A_4$, $A_6$, $A_8$, and $A_{10}$ of the back surface represented by the equation (4) are optimized so that the target value is reached.

Figure 14:
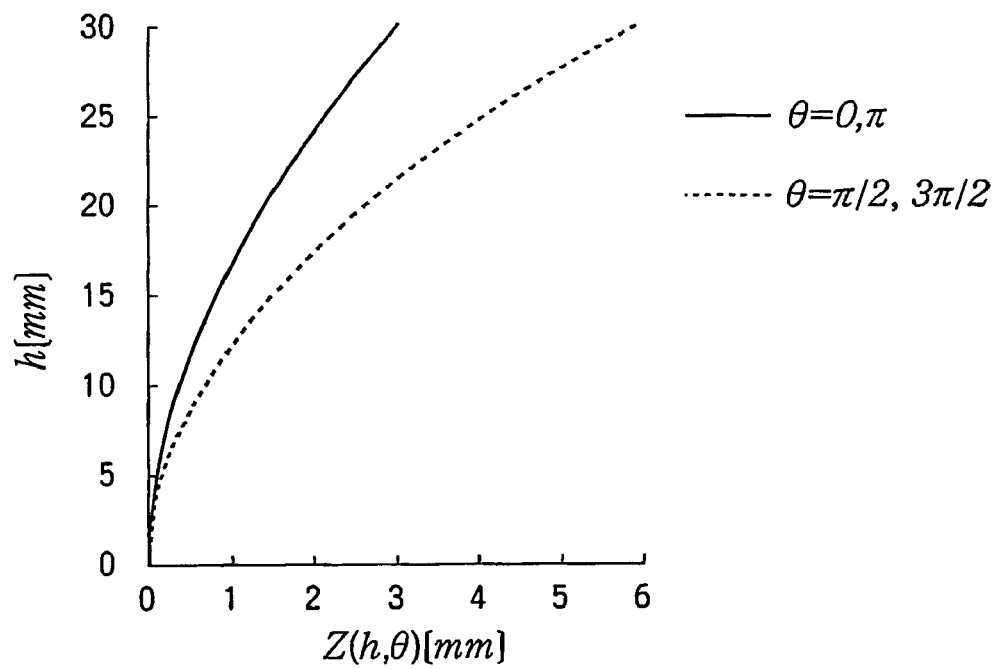
FIG. 14 is a graph illustrating the sag amount of cross sectional shapes optimized according to a third example with respect to a radial height.
Figure 15:
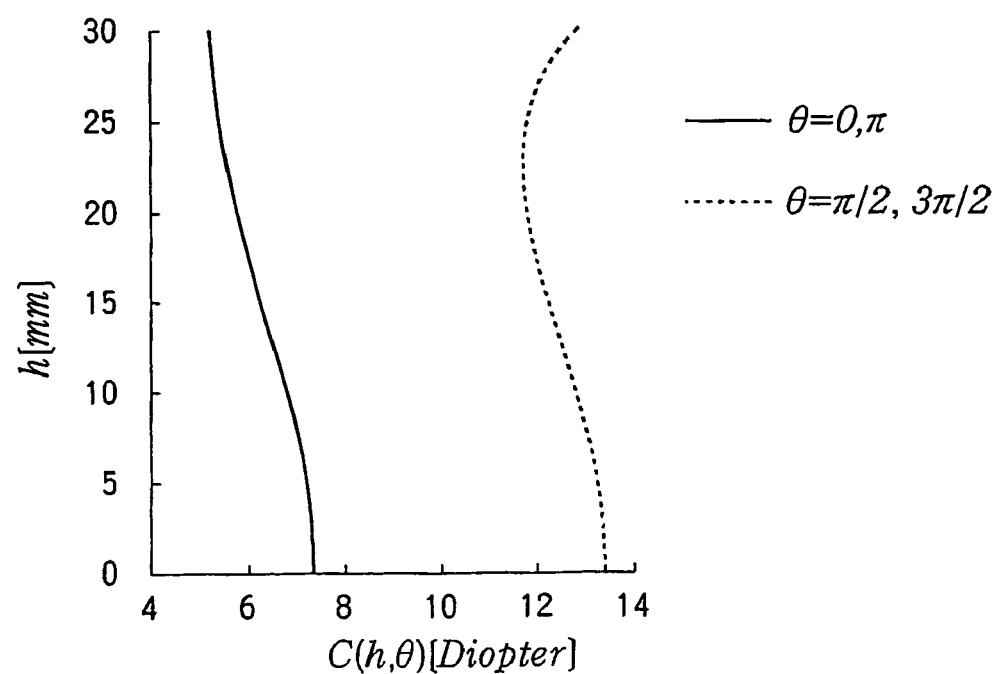
FIG. 15 is a graph illustrating the curvature of the cross-sectional shapes optimized according to the third example with respect to a radial height.

Values of the parameters as a result of the design of the cross-sectional shapes are shown in Table 3. FIG. 14 is a graph illustrating the sag amount of the aspherical surface. FIG. 15 is a graph illustrating the curvature of the cross-sectional shape of the aspherical surface.

TABLE 3

| j | θ | C | κ | $A_4$ | $A_6$ | $A_8$ | $A_{10}$ |
|---|---|---|---|---|---|---|---|
| 0 | 0 | 7.36 | 0.0 | −5.39E−07 | 2.39E−10 | −8.44E−14 | 1.53E−17 |
| 2 | 180 | | | | | | |
| 1 | 90 | 13.38 | 0.0 | −6.19E−07 | 2.53E−10 | −1.41E−13 | 7.89E−17 |
| 3 | 270 | | | | | | |

In the interpolation process according to the third example, the curvature $C_j(h)$ of the aspherical surface of each cross-sectional shape is treated as the characteristic amount. First, the curvature $C_j(h)$ of the aspherical surface is subjected to the interpolation in the direction of the angle of deviation θ. By a symmetric property of a surface, $C_0(h)=C_2(h)$ and $C_1(h)=C_3(h)$. Therefore, the equation (2) is converted to the following equation (6).

$$C(h, \theta) = \frac{\{C_0(h) + C_1(h)\}}{2} + \frac{\{C_0(h) - C_1(h)\}}{2} \cdot \cos(2\theta) \qquad (6)$$

Figure 16:
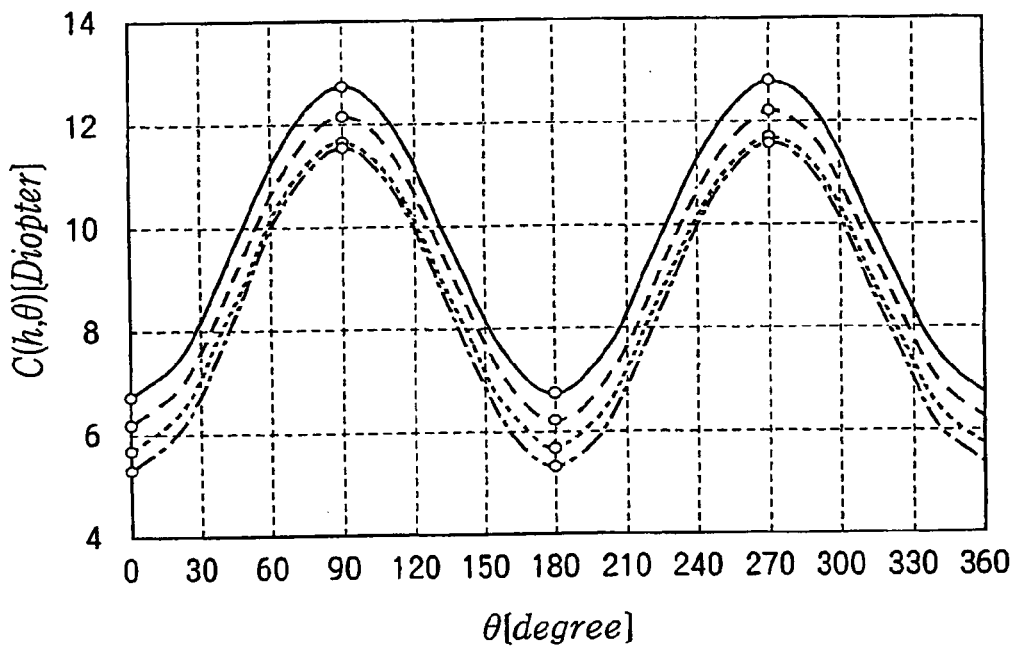
FIG. 16 is a graph illustrating the curvature of the aspherical surface obtained by the interpolation according to the third example with respect to an angle of deviation.
Figure 17:
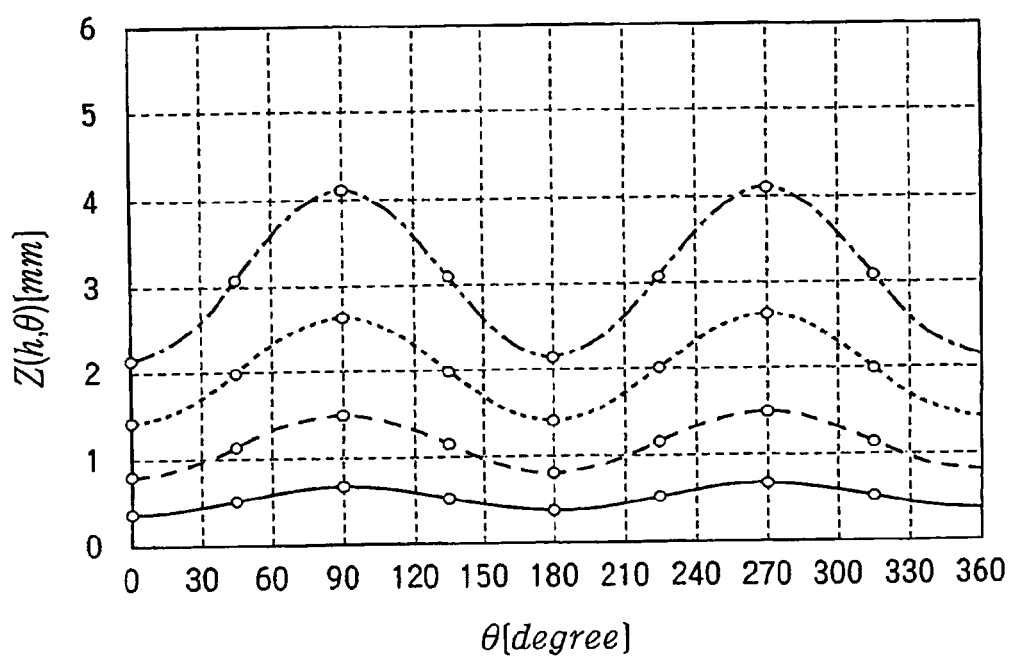
FIG. 17 is a graph illustrating the sag amount of the aspherical surface obtained by the interpolation according to the third example with respect to an angle of deviation.
Figure 18A:
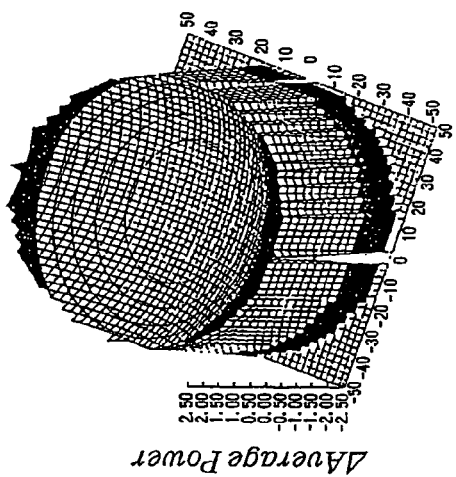
FIGS. 18A to 18F show evaluation results of optical performance of the spectacle lens according to the third example.
Figure 18B:
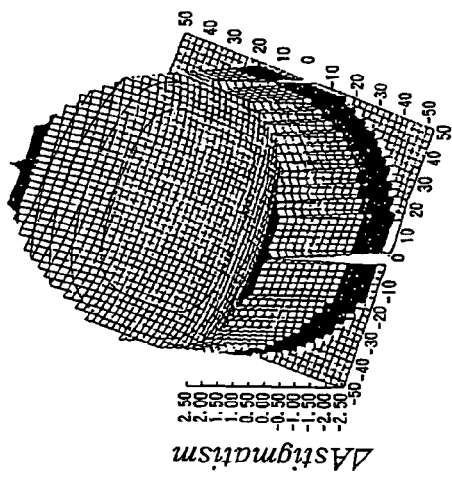
Figure 18C:
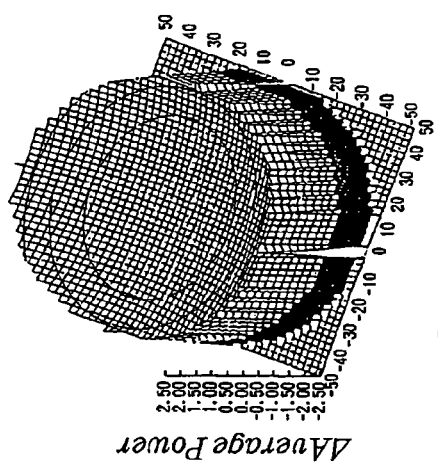
Figure 18D:
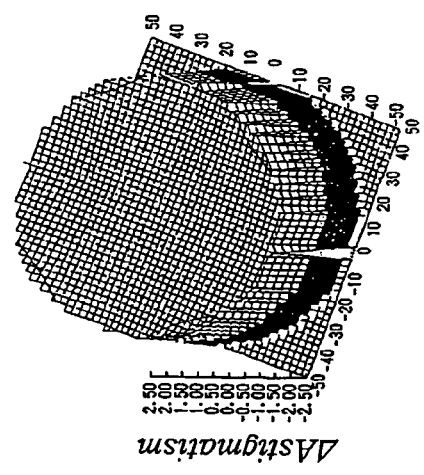
Figure 18E:
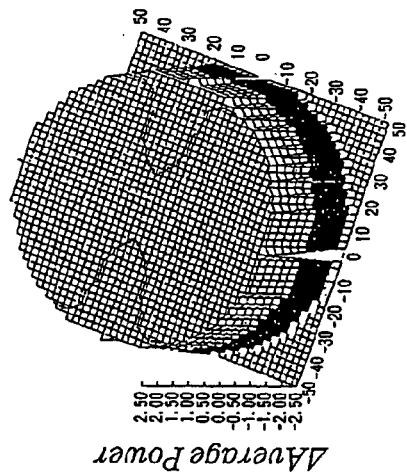
Figure 18F:
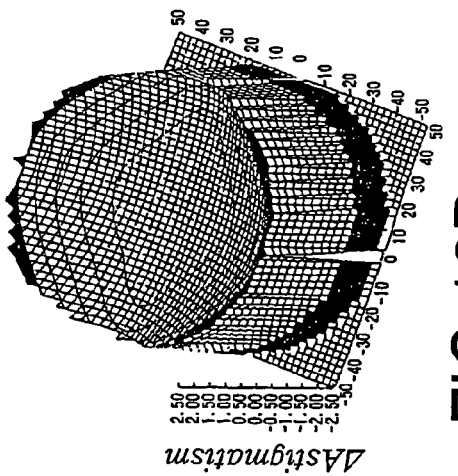

FIG. 16 is a graph illustrating the entire shape of the aspherical surface obtained by the interpolation for each of the heights h of 10, 15, 20 and 25 mm. In FIG. 16, white circles represent the curvature of the cross-sectional shape derived directly from the equation (4).

Next, by integrating the curvature $C(h,\theta)$ of an arbitrary cross-sectional shape two times with regard to a direction of height h as indicated below by equations (7), (8) and (9), the sag amount of the aspherical surface (i.e., the entire shape of the aspherical surface) $Z(h,\theta)$ is obtained. In this case, $p(h, \theta)$ represents inclination of the cross-sectional shape.

$$q(h, \theta) = \int_0^h C(h, \theta) dh \qquad (7)$$

$$p(h, \theta) = \frac{q(h, \theta)}{\{1 - q(h, \theta)^2\}^{1/2}} \qquad (8)$$

$$Z(h, \theta) = \int_0^h p(h, \theta) dh \qquad (9)$$

FIG. 12 is a graph illustrating the entire shape of the aspherical surface obtained by the interpolation for each of the heights h of 10, 15, 20 and 25 mm. In FIG. 12, white circles represent the sag amounts derived directly from the equation (4).

FIGS. 18A to 18F show evaluation results of optical performance of the aspherical surface obtained according to this design example. As can be seen from comparison of FIGS. 18A to 18F with FIGS. 7A to 7F, the astigmatism is sufficiently suppressed and excellent optical performance is attained as in the case of the first example.

In this example, the curvature $C_j(h)$ of the optimized cross-sectional shape is treated as the characteristic amount. Therefore, after the interpolation in the direction of the angle of deviation θ, the integration is performed two times. As a variation of the third example, the second derivative $Zj''(h)/dh^2$ of the cross-sectional shape may be treated as the characteristic amount of an aspherical surface. By performing the calculation similar to the third example, the variation can attain substantially the same advantage as that of the above mentioned advantage of the third example.

FOURTH EXAMPLE

A design example according to a fourth example of the embodiment will be described. In this design example, an unprocessed lens having specifications of spherical power SPH −4.00 (D;Diopter), a prismatic power of PRISM 3.00Δ, and a prism base setting BASE of 270° is treated. The unprocessed lens has a back surface formed as a spherical surface and a front surface formed as a rotationally asymmetrical aspherical surface.

Figure 19:
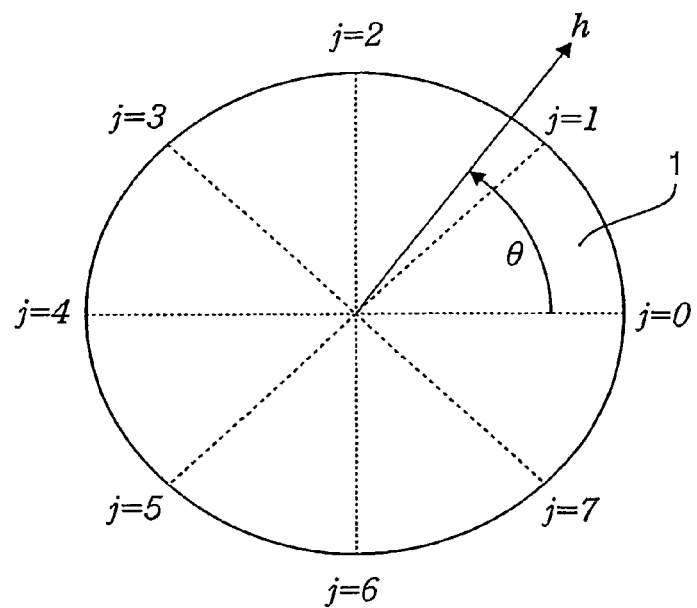
FIG. 19 is a front view illustrating a front surface of a rotationally asymmetrical sypherical spectacle lens designed according to a fourth example.
Figure 20:
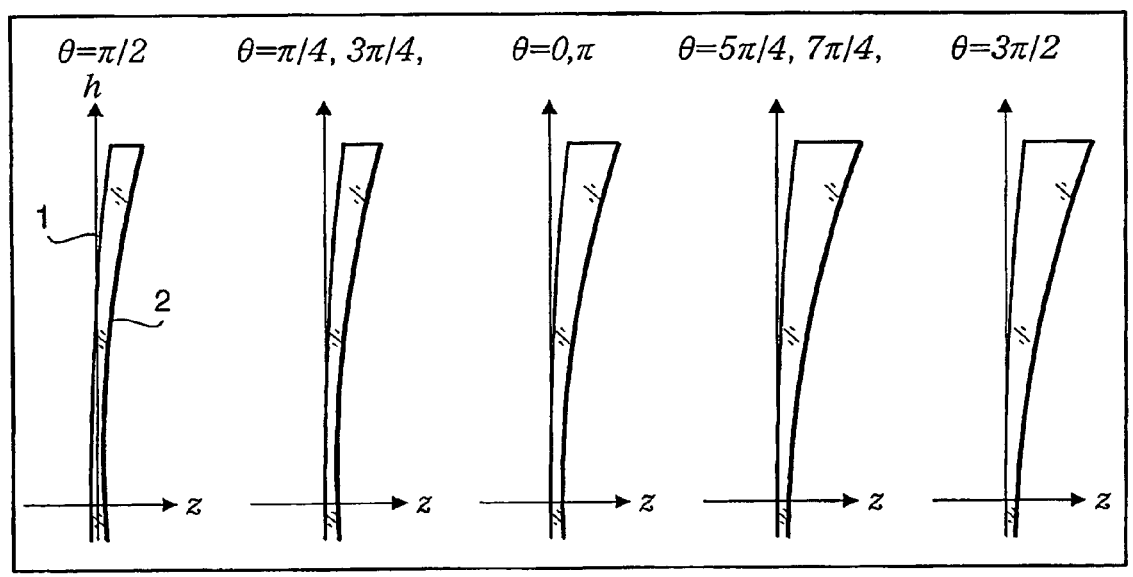
FIG. 20 shows cross-sectional shapes of the rotationally asymmetrical sypherical spectacle lens designed according to the fourth example.

FIG. 19 is a front view illustrating the front surface 1 of an asypherical spectacle lens according to the fourth example. FIG. 20 shows cross-sectional shapes of the asypherical spectacle lens.

In this example, a cross-sectional shape in a direction of the prism base setting is set at the angle of deviation of θ=3π/2. Eight cross-sectional shapes (j=0 to 7), each of which has the reference axis Z as its one end, are selected. That is, the selected eight cross-sectional shapes have angles of deviation of 0, π/4, π/2, 3π/4, π, 5π/4, 3π/2 and 7π/4 from j=0 to j=7.

In view of a symmetric property of the surface, the cross-sectional shapes of j=1 and j=3 have the same shape, the cross-sectional shapes of j=0 and j=4 have the same shape, and the cross-sectional shapes of j=5 and j=7 have the same shape. Therefore, in this example, the design for the aspherical spectacle lens (i.e., the design of the cross-sectional shape and the interpolation) is performed in regard to five different cross sectional shapes. Hereafter, the cross-sectional shape of j=2 is referred to as a first cross-sectional shape, the cross-sectional shape of j=1 and j=3 is referred to as a second cross-sectional shape, the cross-sectional shape of j=0 and j=4 is referred to as a third cross-sectional shape, the cross-sectional shape of j=5 and j=7 is referred to as a fourth cross-sectional shape, and the cross-sectional shape of j=6 is referred to as a fifth cross-sectional shape.

In the design process of the cross-sectional shapes, the first cross-sectional shape is assumed to be a cross-sectional shape of a lens having a spherical power of −4.00 [D] and a prismatic power PRISM −3.00Δ, the second cross-sectional shape is assumed to be a cross-sectional shape of a lens having a spherical power of −4.00 [D] and a prismatic power PRISM−2.12Δ, the third cross-sectional shape is assumed to be a cross-sectional shape of a lens having a spherical power of −4.00 [D] and a prismatic power PRISM 0.00Δ, the fourth cross-sectional shape is assumed to be a cross-sectional shape of a lens having a spherical power of −4.00 [D] and a prismatic power PRISM 2.12Δ, and the fifth cross-sectional shape is assumed to be a cross-sectional shape of a lens having a spherical power of −4.00 [D] and a prismatic power PRISM3.00Δ. As a target value, an average refractive power error at an object distance of infinity is set to zero [D].

For each of the first and fifth cross sectional shapes, the aspherical coefficients $A_4$, $A_6$, $A_8$, and $A_{10}$ of the front surface represented by the equation (4) are optimized so that the target value is reached.

Figure 21:
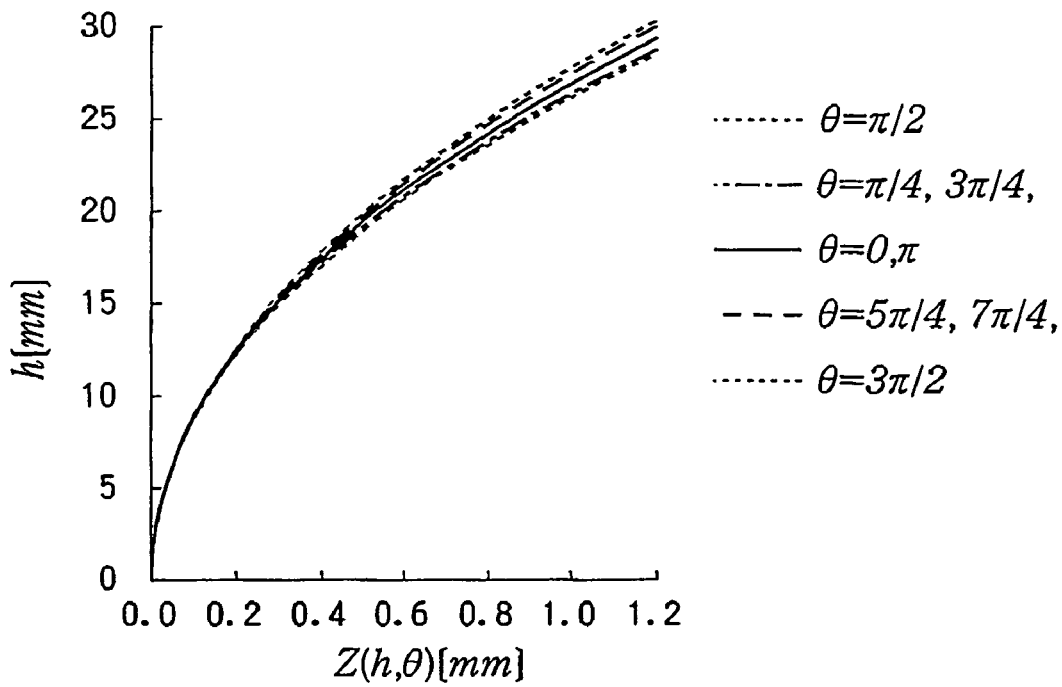
FIG. 21 is a graph illustrating the sag amount of cross sectional shapes optimized according to the fourth example with respect to a radial height.
Figure 22:
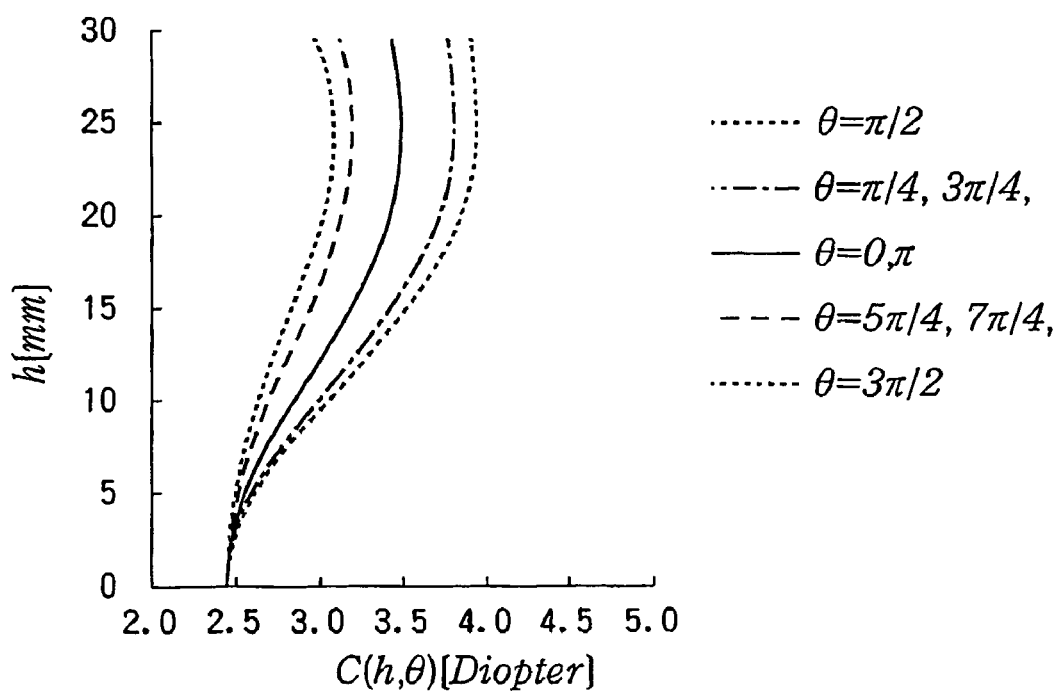
FIG. 22 is a graph illustrating the curvature of the cross-sectional shapes optimized according to the fourth example with respect to a radial height.
Figure 24A:
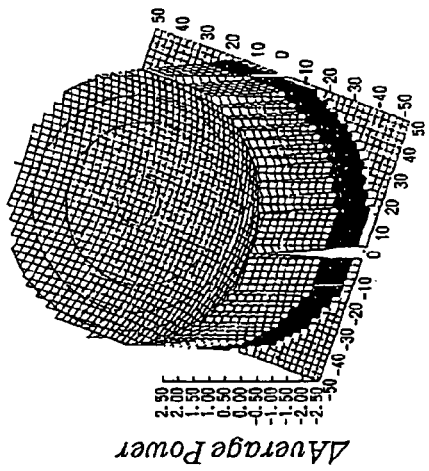
FIGS. 24A to 24F show evaluation results of optical performance of the spectacle lens according to the fourth example.
Figure 24B:
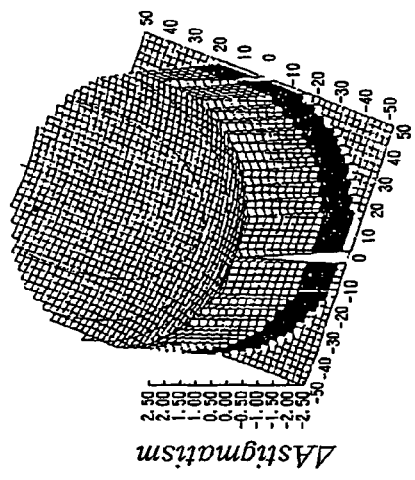
Figure 24C:
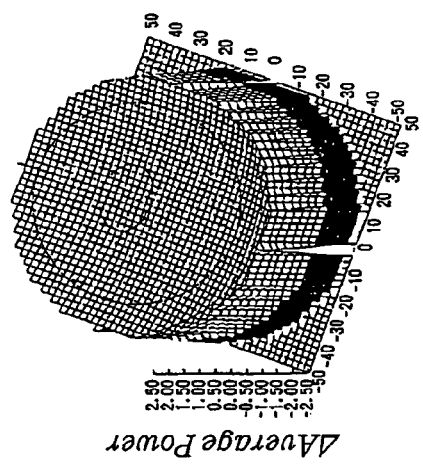
Figure 24D:
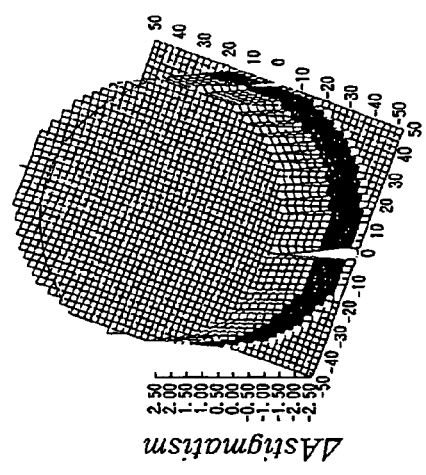
Figure 24E:
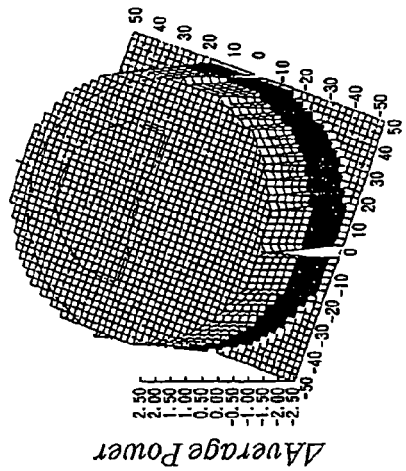
Figure 24F:
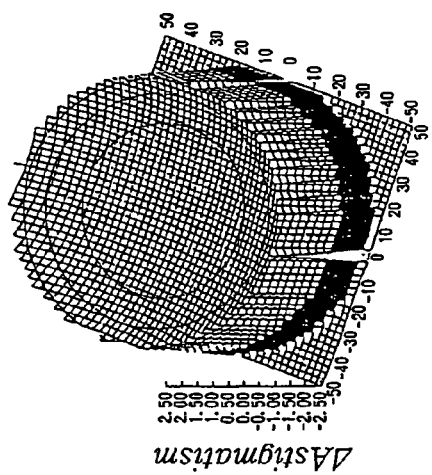

Values of the parameters as a result of the design of the cross-sectional shapes are shown in Table 4. FIG. 21 is a graph illustrating the sag amount of the aspherical surface. FIG. 22 is a graph illustrating the curvature of the cross-sectional shape of the aspherical surface.

TABLE 4

| j | θ | C | κ | $A_4$ | $A_6$ | $A_8$ | $A_{10}$ |
|---|---|---|---|---|---|---|---|
| 2 | 90 | 2.44 | 0.0 | 5.88E−07 | −3.98E−10 | 1.55E−13 | −2.56E−17 |
| 1 | 45 | 2.44 | 0.0 | 5.26E−07 | −3.48E−10 | 1.32E−13 | −2.15E−17 |
| 3 | 135 | | | | | | |
| 0 | 0 | 2.44 | 0.0 | 3.80E−07 | −2.30E−10 | 7.86E−14 | −1.22E−17 |
| 4 | 180 | | | | | | |
| 5 | 225 | 2.44 | 0.0 | 2.35E−07 | −1.12E−10 | 2.54E−14 | −2.92E−18 |
| 7 | 315 | | | | | | |
| 6 | 270 | 2.44 | 0.0 | 1.66E−07 | −4.05E−10 | −1.61E−13 | 6.33E−18 |

Next, using the sag amount Zj(h) of each cross-sectional shape obtained by the above mentioned design process, the entire shape of the aspherical surface is determined by the interpolation in the direction of the angle of deviation θ.

FIG. 23 is a graph illustrating the entire shape of the aspherical surface obtained by the interpolation for each of the heights h of 10, 15, 20 and 25 mm. In FIG. 23, white circles represent the sag amounts derived directly from the equation (4).

FIGS. 24A to 24F show evaluation results of optical performance of the aspherical surface obtained according to this design example.

Consider an aspherical spectacle lens according to a second comparative example. The lens according to the second comparative example is formed by tilting the front surface without changing its shape (i.e. the rotationally asymmetrical aspherical shape) so that a predetermined prismatic power is given to the aspherical spectacle lens. FIG. 39 shows optical performance of the aspherical spectacle lens according to the second comparative example.

As shown in FIG. 39, the optical performance of the lens according to the second comparative example is considerably deteriorated. By contrast, according to the forth example, the optical performance (the average refractive power error 0[D] at the object distance of infinity) of the cross-sectional shape is almost maintained in the aspherical surface obtained by the interpolation. That is, according to the fourth example, excellent optical performance is attained.

FIFTH EXAMPLE

A design example according to a fifth example of the embodiment will be described. In this design example, an unprocessed lens having a cylindrical power as well as a prismatic power is treated. Specifically, the unprocessed lens has a spherical power SPH of +4.00 D, a cylindrical power CYL of +2.00 D, a cylinder axis AX of 45°, a prismatic power PRISM of 3.00Δ, and prism base setting BASE of 90°. The unprocessed lens has a front surface formed as a spherical surface and a back surface formed as a rotationally asymmetrical aspherical surface.

Figure 25:
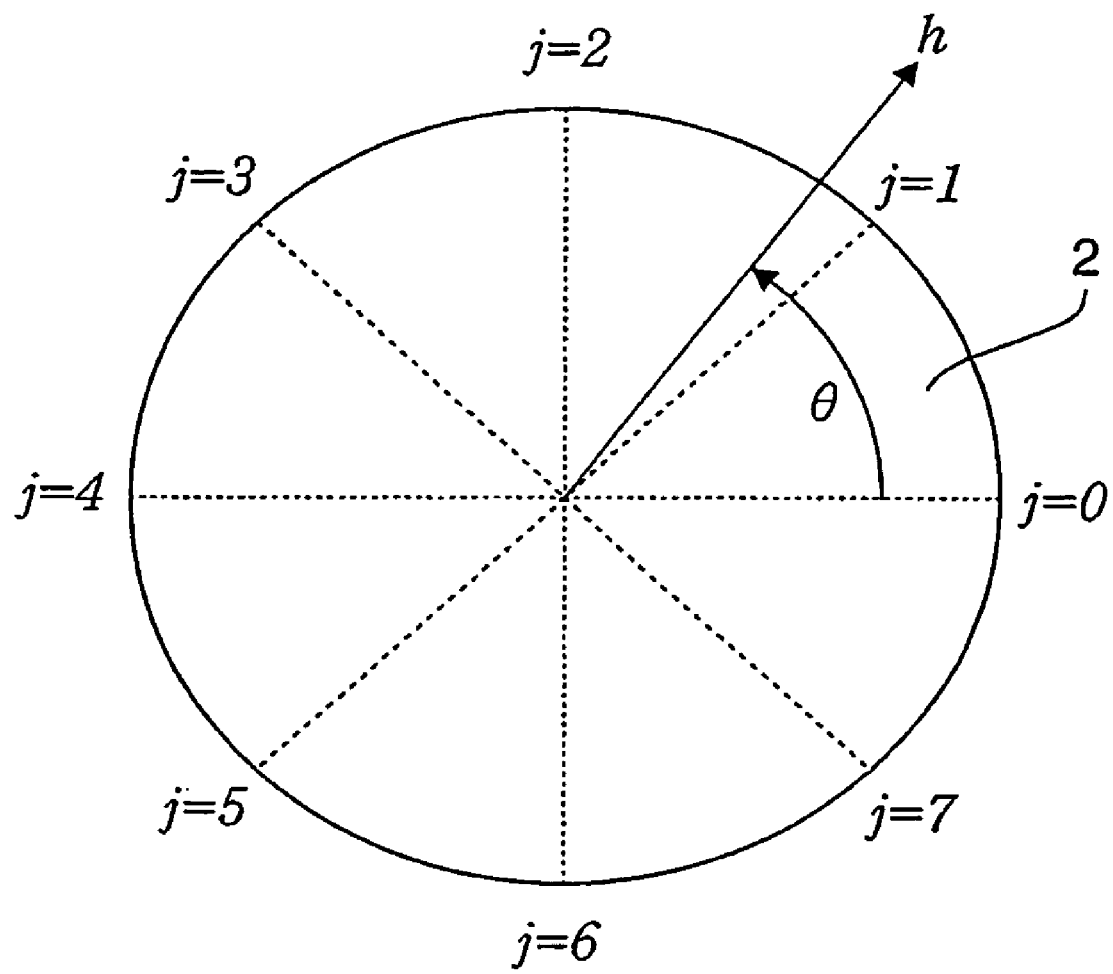
FIG. 25 is a front view illustrating a back surface of a rotationally asymmetrical sypherical spectacle lens designed according to a fifth example.
Figure 26:
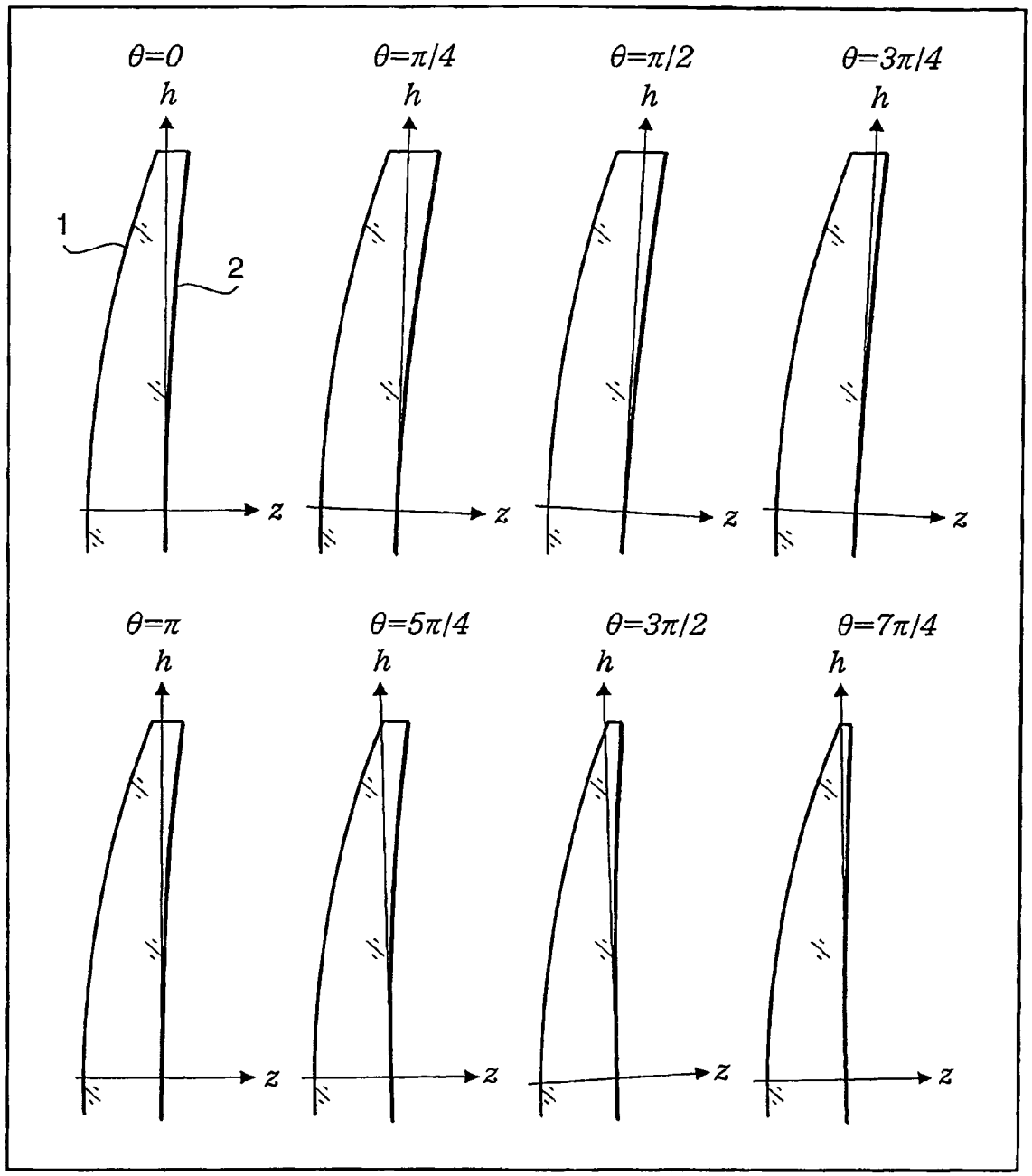
FIG. 26 shows cross-sectional shapes of the rotationally asymmetrical sypherical spectacle lens designed according to the fifth example.

FIG. 25 is a front view illustrating an aspherical surface (the back surface) of an aspherical spectacle lens according to the fifth example. FIG. 26 shows cross-sectional shapes of the asypherical spectacle lens.

In this example, a cross-sectional shape in a direction of the prism base setting is set at the angle of deviation of θ=π/2. Eight cross-sectional shapes (j=0 to 7), each of which has the reference axis Z as its one end, are selected. That is, the selected eight cross-sectional shapes have angles of deviation of 0, π/4, π/2, 3π/4, π, 5π/4, 3π/2 and 7π/4 from j=0 to j=7.

In general, with regard to a lens having a cylindrical power as well as a prismatic power, eight cross-sectional shapes selected according to a cylinder axis and prism base setting frequently have shapes different from one another. For this reason, all of the eight cross-sectional shapes are illustrated in FIG. 26 although the cross-sectional shape of j=0 (θ=0°) equals to the cross-sectional shape of j=4 (θ=270°).

In the design process of the cross-sectional shapes, the cross-sectional shape of j=0 is assumed to be a cross-sectional shape of a lens having a spherical power SPH of +4.00 [D], and a prismatic power PRISM 0.00Δ. The cross-sectional shape of j=1 is assumed to be a cross-sectional shape of a lens having a spherical power SPH of +4.00 [D] and a prismatic power PRISM 2.12Δ. The cross-sectional shape of j=2 is assumed to be a cross-sectional shape of a lens having a spherical power SPH of +5.00 [D] and a prismatic power PRISM 3.00Δ. The cross-sectional shape j=3 is assumed to be a cross-sectional shape of a lens having a spherical power SPH of +6.00 [D] and a prismatic power PRISM 2.12Δ. The cross-sectional shape of j=4 is assumed to be a cross-sectional shape of a lens having a spherical power SPH of +5.00 [D] and a prismatic power PRISM 0.00Δ. The cross-sectional shape of j=5 is assumed to be a cross-sectional shape of a lens having a spherical power SPH of +5.00 [D] and a prismatic power PRISM −2.12Δ. The cross-sectional shape of j=6 is assumed to be a cross-sectional shape of a lens having a spherical power SPH of +5.00 [D] and a prismatic power PRISM −3.00Δ. The cross-sectional shape of j=7 is assumed to be a cross-sectional shape of a lens having a spherical power SPH of +6.00 [D] and a prismatic power PRISM −2.12Δ. As a target value, an average refractive power error at an object distance of infinity is set to zero [D].

For each of the cross sectional shapes of j=0 to 7, the aspherical coefficients $A_4$, $A_6$, $A_8$, and $A_{10}$ of the back surface represented by the equation (4) are optimized so that the target value is reached.

Figure 27:
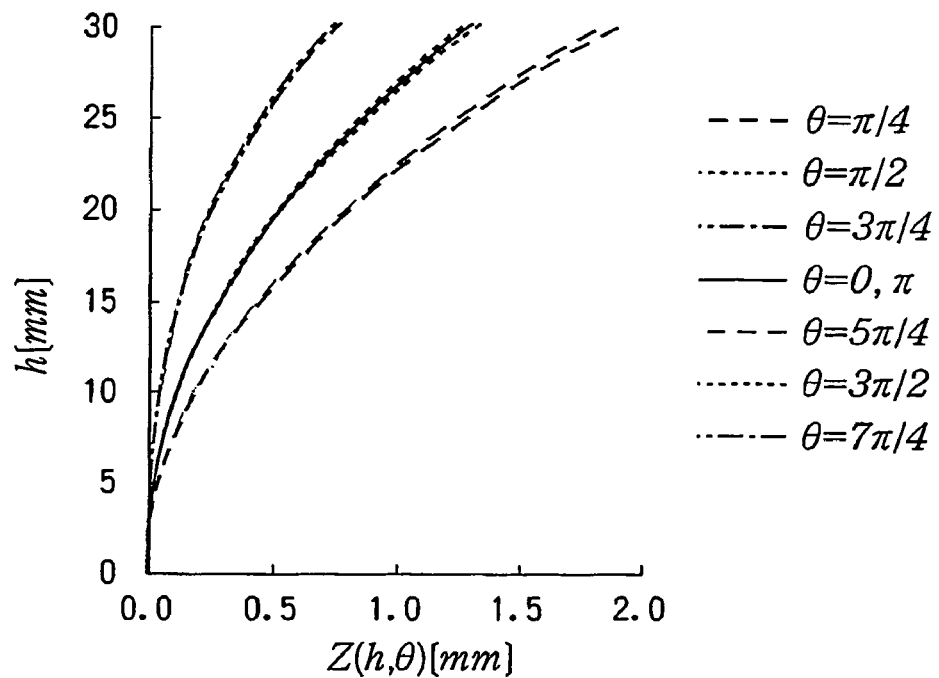
FIG. 27 is a graph illustrating the sag amount of cross sectional shapes optimized according to the fifth example with respect to a radial height.
Figure 28:
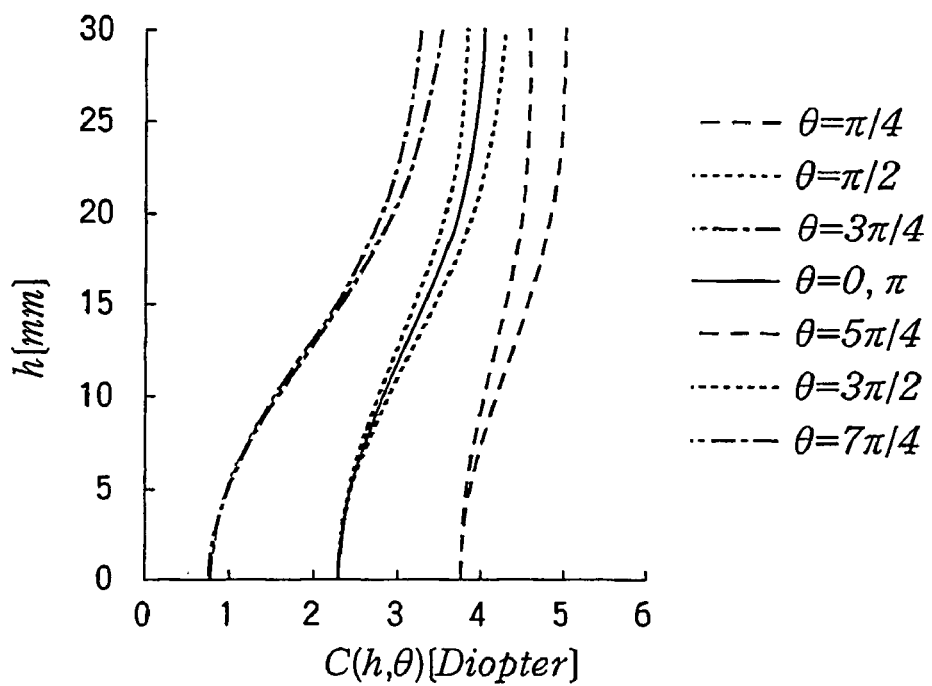
FIG. 28 is a graph illustrating the curvature of the cross-sectional shapes optimized according to the fifth example with respect to a radial height.
Figure 30A:
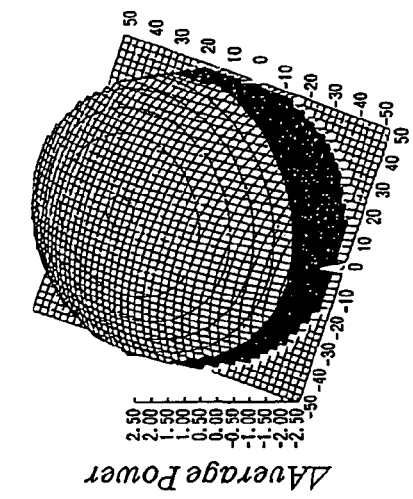
FIGS. 30A to 30F show evaluation results of optical performance of the spectacle lens according to the fifth example.
Figure 30B:
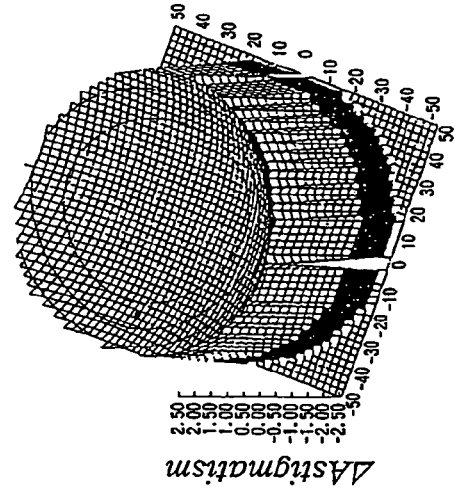
Figure 30C:
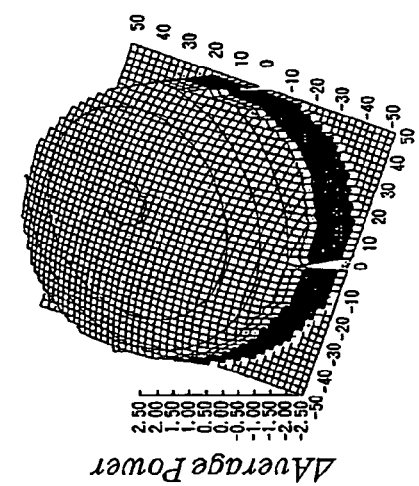
Figure 30D:
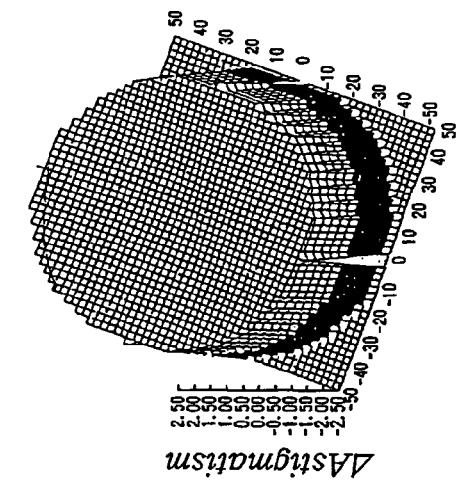
Figure 30E:
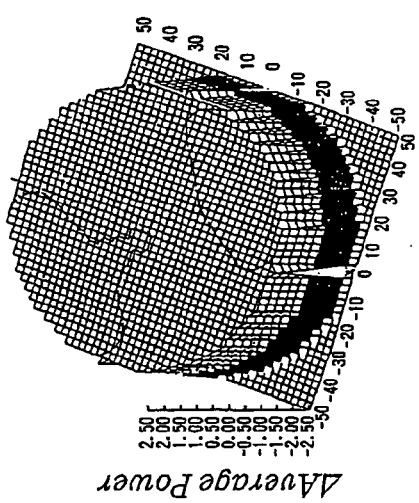
Figure 30F:
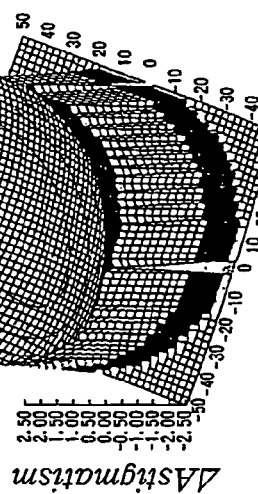

Values of the parameters as a result of the design of the cross-sectional shapes are shown in Table 5. FIG. 27 is a graph illustrating the sag amount of the aspherical surface. FIG. 28 is a graph illustrating the curvature of the cross-sectional shape of the aspherical surface.

TABLE 5

| j | θ | C | κ | $A_4$ | $A_6$ | $A_8$ | $A_{10}$ |
|---|---|---|---|---|---|---|---|
| 0 | 0 | 2.27 | 0.0 | 5.58E-07 | -3.35E-10 | 1.25E-13 | -2.03E-17 |
| 1 | 45 | 3.77 | 0.0 | 4.48E-07 | -2.97E-10 | 1.22E-13 | -2.16E-17 |
| 2 | 90 | 2.27 | 0.0 | 6.25E-07 | -3.76E-10 | 1.45E-13 | -2.45E-17 |
| 3 | 135 | 0.77 | 0.0 | 7.98E-07 | -4.55E-10 | 1.66E-13 | -2.65E-17 |
| 4 | 180 | 2.27 | 0.0 | 5.58E-07 | -3.35E-10 | 1.25E-13 | -2.03E-17 |
| 5 | 225 | 3.77 | 0.0 | 2.91E-07 | -1.75E-10 | 6.27E-14 | -9.75E-18 |
| 6 | 270 | 2.27 | 0.0 | 4.95E-07 | -2.93E-10 | 1.06E-13 | -1.64E-17 |
| 7 | 315 | 0.77 | 0.0 | 7.68E-07 | -4.51E-10 | 1.63E-13 | -2.52E-17 |

Next, using the sag amount $Z_j(h)$ of each cross-sectional shape obtained by the above mentioned design process, the entire shape of the aspherical surface is determined by the interpolation in the direction of the angle of deviation θ.

FIG. 29 is a graph illustrating the entire shape of the aspherical surface obtained by the interpolation for each of the heights h of 10, 15, 20 and 25 mm. In FIG. 29, white circles represent the sag amounts derived directly from the equation (4).

FIGS. 30A to 30F show evaluation results of optical performance of the aspherical surface obtained according to this design example. As can be seen from FIGS. 30A o 30F, the optical performance of each cross-sectional shape, which is designed to have the average refractive power error of 0 [D] at an object distance of infinity, is also maintained in regard to the performance of aspherical spectacle lens.

SIXTH EXAMPLE

A design example according to a sixth example of the embodiment will be described. In this design example, an unprocessed lens having a spherical power SPH of +4.00 D (not having a cylindrical power and a prismatic power) is treated. The unprocessed lens has a front surface formed as a spherical surface and a back surface formed as a rotationally asymmetrical aspherical surface.

Figure 31:
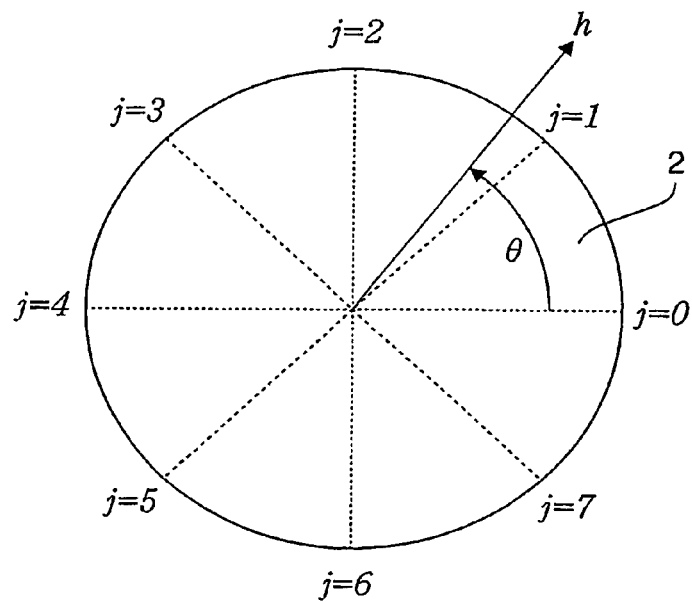
FIG. 31 is a front view illustrating a back surface of a rotationally asymmetrical sypherical spectacle lens designed according to a sixth example.
Figure 32:
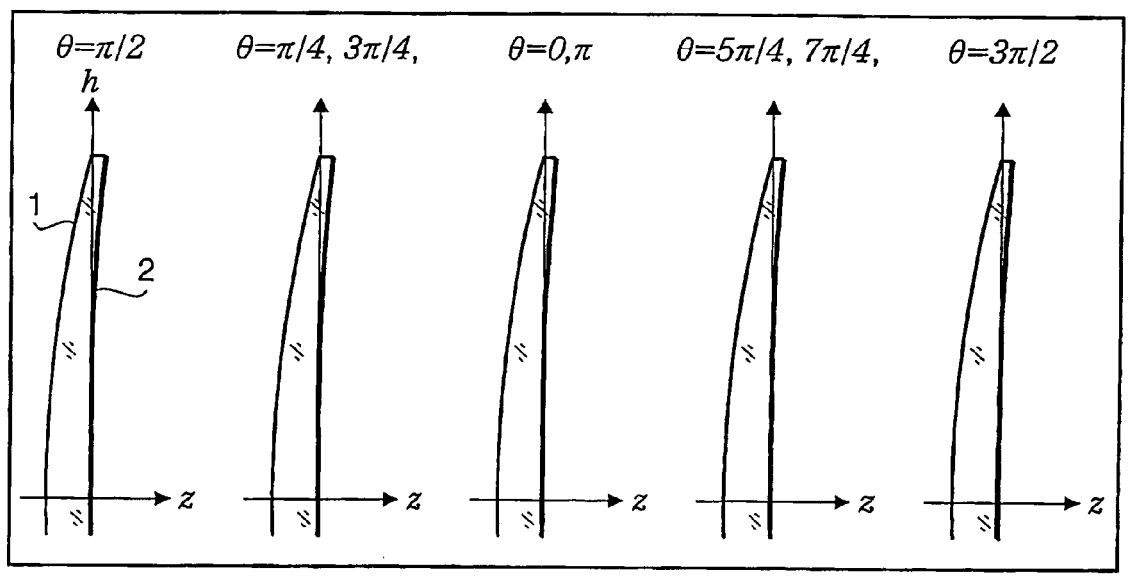
FIG. 32 shows cross-sectional shapes of the rotationally asymmetrical sypherical spectacle lens designed according to the sixth example.
Figure 33:
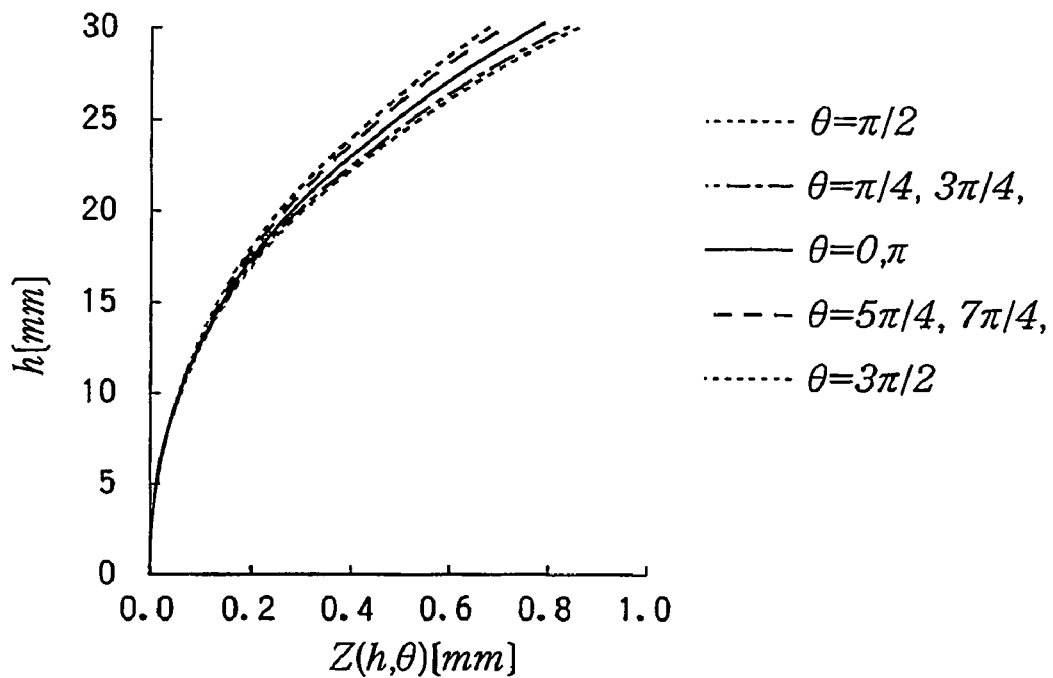
FIG. 33 is a graph illustrating the sag amount of cross sectional shapes optimized according to the sixth example with respect to a radial height.
Figure 34:
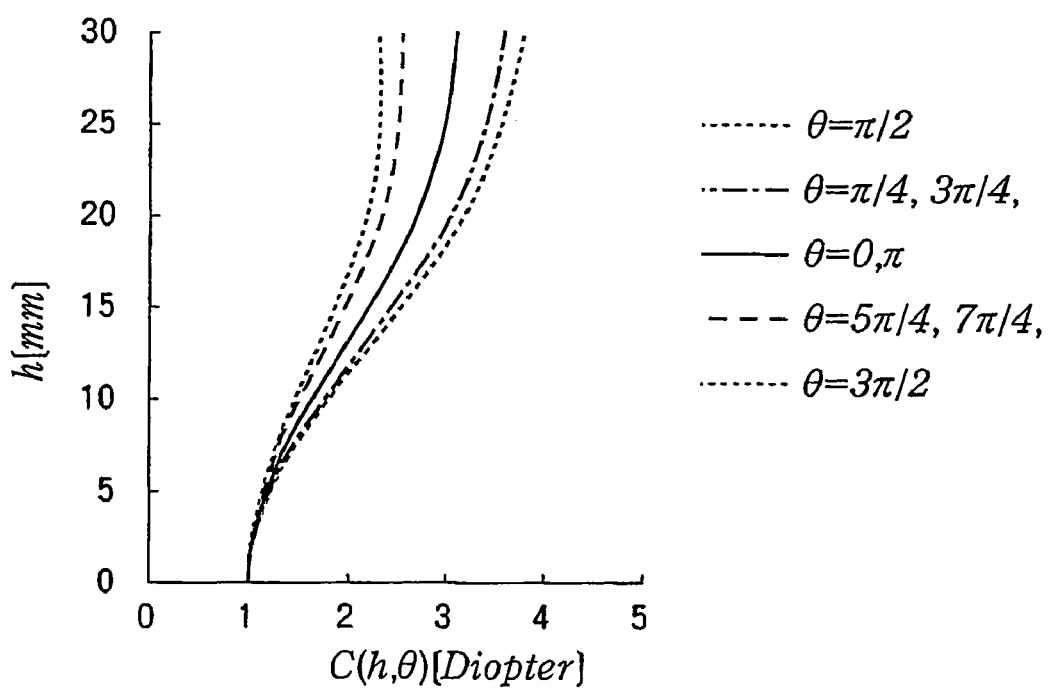
FIG. 34 is a graph illustrating the curvature of the cross-sectional shapes optimized according to the sixth example with respect to a radial height.

FIG. 31 is a front view illustrating an aspherical surface (the back surface) of an aspherical spectacle lens according to the sixth example. FIG. 32 shows cross-sectional shapes of the asypherical spectacle lens.

In this example, a direction in which optical performance of distance vision is emphasized is set to a direction of a cross-sectional shape of j=2, and a direction in which optical performance of near vision is emphasized is set to a direction of a cross-sectional shape of j=6. Eight cross-sectional shapes (j=0 to 7), each of which has the reference axis Z as its one end, are selected. That is, the selected eight cross-sectional shapes have angles of deviation of 0, π/4, π/2, 3π/4, π, 5π/4, 3π/2 and 7π/4 from j=0 to j=7.

In view of a symmetric property of the surface, the cross-sectional shapes of j=1 and j=3 have the same shape, the cross-sectional shapes of j=0 and j=4 have the same shape, and the cross-sectional shapes of j=5 and j=7 have the same shape. Therefore, in this example, the design for the aspherical spectacle lens (i.e., the design of the cross-sectional shape and the interpolation) is performed in regard to five different cross sectional shapes. Hereafter, the cross-sectional shape of j=2 is referred to as a first cross-sectional shape, the cross-sectional shape of j=1 and j=3 is referred to as a second cross-sectional shape, the cross-sectional shape of j=0 and j=4 is referred to as a third cross-sectional shape, the cross-sectional shape of j=5 and j=7 is referred to as a fourth cross-sectional shape, and the cross-sectional shape of j=6 is referred to as a fifth cross-sectional shape.

In the design process of the selected cross-sectional shapes, each of the first to fifth cross-sectional shapes is assumed to be a cross-sectional shape of a lens having a spherical power SPH of -4.00 [D]. As a target value, an average refractive power error at an object distance of infinity is set to zero [D].

In contrast to the above mentioned first to fourth examples, the spectacle lens is designed such that an object distance at which suitable optical performance is attained (i.e., a low level of astigmatism is obtained) changes depending on a position on the lens. More specifically, with regard to a direction of the first cross-sectional shape, the spectacle lens is designed such that suitable optical performance is obtained at an object distance of infinity. With regard to a direction of the fifth cross-sectional shape, the spectacle lens is designed such that suitable optical performance is obtained for near object distance (at an object distance of -250 mm). With regard to an intermediate direction between the first and fifth cross-sectional shapes, the spectacle lens is designed such that suitable optical performance is obtained at an intermediate object distance.

Therefore, in this example, a plurality of target values are determined. That is, as the target value, astigmatism is set to zero [D] is set to zero for each of object distances of -1707 mm, -500 mm, -293 mm and -250 mm.

For each of the first to fifth cross sectional shapes, the aspherical coefficients $A_4$, $A_6$, $A_8$, and $A_{10}$ of the back surface represented by the equation (4) are optimized so that the target value is reached.

TABLE 6

| j | θ | C | κ | $A_4$ | $A_6$ | $A_8$ | $A_{10}$ |
|---|---|---|---|---|---|---|---|
| 2 | 90 | 1.03 | 0.0 | 7.69E-07 | -4.19E-10 | 1.46E-13 | -2.22E-17 |
| 1 | 45 | 1.03 | 0.0 | 7.22E-07 | -3.96E-10 | 1.38E-13 | -2.09E-17 |
| 3 | 135 | | | | | | |
| 0 | 0 | 1.03 | 0.0 | 6.09E-07 | -3.42E-10 | 1.19E-13 | -1.79E-17 |
| 4 | 180 | | | | | | |
| 5 | 225 | 1.03 | 0.0 | 4.95E-07 | -2.91E-10 | 1.01E-13 | -1.51E-17 |
| 7 | 315 | | | | | | |
| 6 | 270 | 1.03 | 0.0 | 4.47E-07 | -2.70E-10 | 9.38E-14 | -1.41E-17 |

Next, using the sag amount Zj(h) of each cross-sectional shape obtained by the above mentioned design process, the entire shape of the aspherical surface is determined by the interpolation in the direction of the angle of deviation θ.

Figure 35:
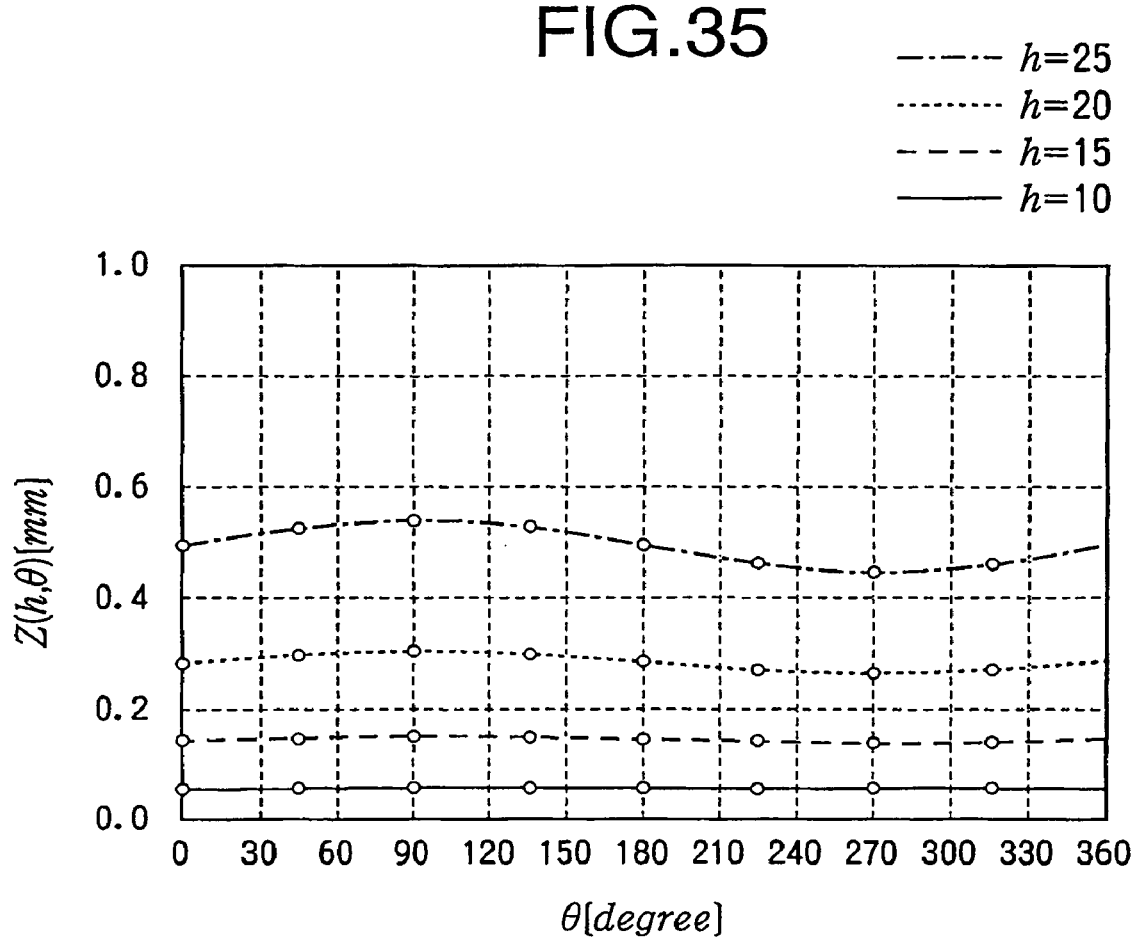
FIG. 35 is a graph illustrating the sag amount of the aspherical surface obtained by the interpolation according to the sixth example with respect to an angle of deviation.

FIG. 35 is a graph illustrating the entire shape of the aspherical surface obtained by the interpolation for each of the heights h of 10, 15, 20 and 25 mm. In FIG. 35, white circles represent the sag amounts derived directly from the equation (4).

Figure 36A:
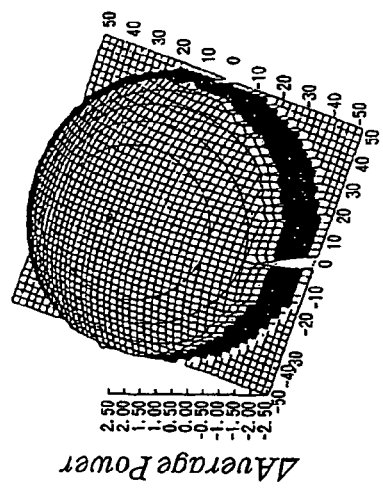
FIGS. 36A to 36F show evaluation results of optical performance of the spectacle lens according to the sixth example.
Figure 36B:
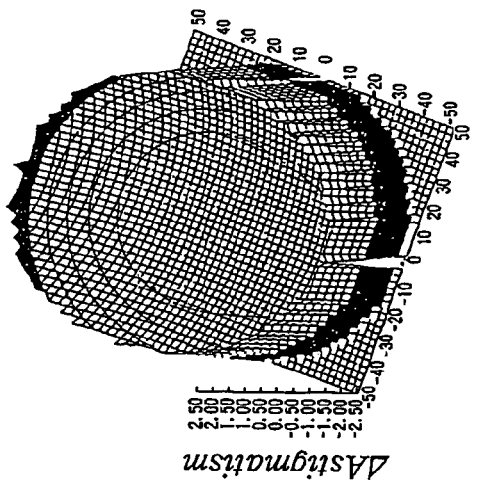
Figure 36C:
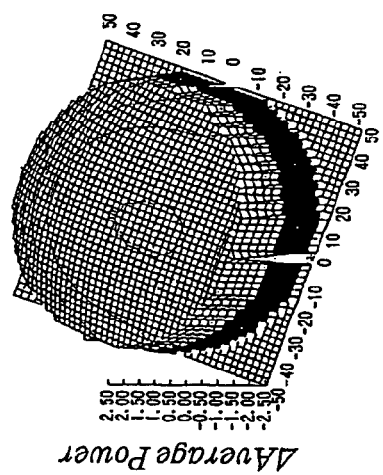
Figure 36D:
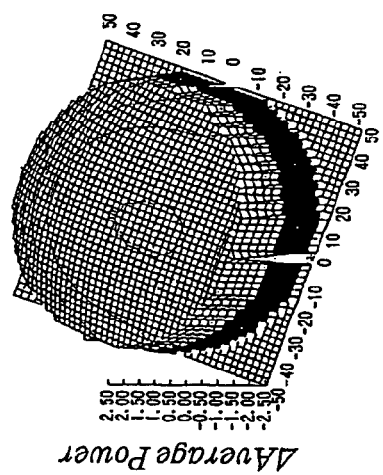
Figure 36E:
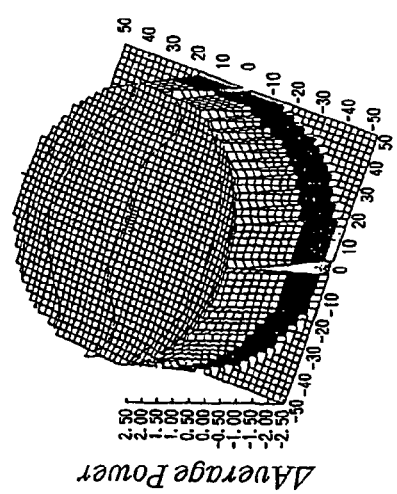
Figure 36F:
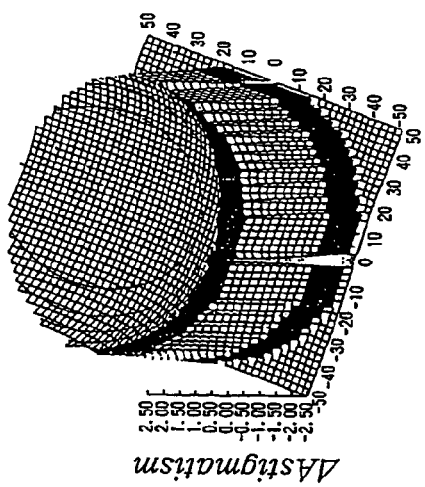

FIGS. 36A to 36F show evaluation results of optical performance of the aspherical surface obtained according to this design example. As shown in FIG. 36B, the astigmatism in the upper region of the lens is low with regard to the distance vision. As shown in FIG. 36F, the astigmatism in the lower region of the lens is low with regard to the near vision. Therefore, according to the sixth example, excellent optical performance is attained.

FIG. 40 shows specifications of the aspherical spectacle lenses respectively designed according to the first to sixth examples. In FIG. 40, a number inside the parentheses in each "the number of cross-sectional shapes" section represents the number of cross-sectional shapes actually designed. In an "aberration targeted for evaluation" section of FIG. 40, AS represents astigmatism, DM represents a meridional refractive power error, AP represents an average refractive power error, and a number inside the parentheses represents an object distance. As shown in FIG. 40, according to the embodiment, it is possible to design an aspherical spectacle lens having excellent optical performance regardless of whether the aspherical spectacle lens is provided with a cylindrical power and/or a prismatic power. That is, according to the embodiment, it is possible to produce a spectacle lens having an rotationally asymmetrical aspherica surface such that excellent optical performance is attained without requiring a designer to perform a complicated designed process regardless of whether the spectacle lens has an asymmetric power property such as a cylindrical power and a prismatic power.

What is claimed is:

1. A method of designing a spectacle lens having a front surface and a back surface, at least one of the front and back surfaces is formed as a rotationally asymmetrical aspherical surface, comprising the steps of:
    selecting a plurality of cross-sections of the spectacle lens respectively defined in a plurality of planes each of which includes a reference axis passing through the front and back surfaces at a point substantially equal to a center of an outer diameter of the spectacle lens, each of the plurality of cross-sections having one side coinciding with the reference axis;
    designing each of shapes of the plurality of cross-sections so that predetermined optical performance is optimized for each of the shapes of the plurality of cross-sections; and
    interpolating a characteristic amount regarding intermediate points on the rotationally asymmetrical aspherical surface between the shapes of the plurality of cross-sections using a characteristic amount of each of the shapes of the plurality of cross-sections.

2. The method according to claim 1, wherein the characteristic amount relates to an aspherical surface shape.

3. The method according to claim 1, wherein:
    the predetermined optical performance includes a predetermined aberration; and
    in the step of the designing the each of the shapes of the plurality of cross-sections is designed such that the predetermined aberration reaches substantially zero.

4. The method according to claim 1, wherein:
    the characteristic amount regarding intermediate points on the rotationally asymmetrical aspherical surface includes a sag amount of the rotationally asymmetrical aspherical surface; and
    the characteristic amount of each of the shapes of the selected plurality of cross-sections includes a sag amount of each of the shapes of the plurality of cross-sections.

5. The method according to claim 4, wherein:
    the spectacle lens to be designed has a cylindrical power;
    the plurality of cross-sections selected in the step of selecting include a maximum refractive power cross-section and a minimum refractive power cross-section; and
    in the step of the interpolating, the characteristic amount regarding intermediate points on the rotationally asymmetrical aspherical surface is interpolated according to a non-sine-wave-like function using sag amounts of the maximum and minimum refractive power cross sections.

6. The method according to claim 5, wherein:
    the maximum and minimum refractive power cross-sections are defined in a polar coordinate system defined by a pole, which is an intersection point of the reference axis and the rotationally asymmetrical aspherical surface, and a plane with which the reference axis perpendicularly intersects, and the maximum refractive power cross-section is set at an angle of deviation θ of 0 and the minimum refractive power cross section is set at an angle of deviation θ of π/2; and
    the sag amount regarding intermediate points on the rotationally asymmetrical aspherical surface is interpolated assigning a sag amount of the maximum refractive power cross-section and a sag amount of the minimum refractive power cross-section to the non-sine-wave-like function:

$$Z(h, \theta) = \frac{\{Z_a(h) + Z_b(h)\}}{2} + \frac{\{Z_a(h) - Z_b(h)\}}{2} \cdot \cos\{2\theta + \mu h \sin(2\theta)\} \quad (3)$$

where Za(h) represents the sag amount of the maximum refractive power cross-section, Zb(h) represents the sag amount of the minimum refractive power cross-section, μ is a coefficient representing a degree of change from a sine wave.

7. The method according to claim 1, wherein:
    the characteristic amount regarding intermediate points on the rotationally asymmetrical aspherical surface includes curvatures of cross-sectional shapes of the rotationally asymmetrical aspherical surface; and
    the characteristic amount of each of the shapes of the selected plurality of cross-sections includes a curvature of each of the shapes of the selected plurality of cross-sections.

8. The method according to claim 7, further comprising the step of determining a shape of the rotationally asymmetrical aspherical surface by integrating the characteristic amount regarding intermediate points on the rotationally asymmetrical aspherical surface interpolated by the step of the interpolating.

9. The method according to claim 1, wherein:
    the characteristic amount regarding intermediate points on the rotationally asymmetrical aspherical surface includes second derivatives of cross-sectional shapes of the rotationally asymmetrical aspherical surface; and the characteristic amount of each of the shapes of the selected plurality of cross-sections includes a second derivative of each of the shapes of the selected plurality of cross-sections.

10. The method according to claim 9, further comprising the step of determining a shape of the rotationally asymmetrical aspherical surface by integrating the characteristic amount regarding intermediate points on the rotationally asymmetrical aspherical surface interpolated by the step of the interpolating.

11. The method according to claim 1, wherein a number of a plurality of cross-sections selected in the step of the selecting is more than four.

12. The method according to claim 11, wherein the plurality of cross-sections selected in the step of the selecting includes cross-sections having the same shape depending on a symmetric property that the spectacle lens has.

13. The method according to claim 11, wherein the number of a plurality of cross-sections selected in the step of the selecting is eight.

14. The method according to claim 1, wherein:

in the step of the selecting the plurality of cross-sections, the cross-sectional shapes are defined in a polar coordinate system defined by a pole, which is an intersection point of the reference axis and the rotationally asymmetrical aspherical surface, and a plane with which the reference axis perpendicularly intersects, and the cross-sectional shapes are selected for each of angles of deviation defined in accordance with an equation:

$$\theta j = 2\pi j/n \quad (1)$$

where n represents a number of cross-sections to be selected (n is an even number), and j represents a number of each cross-sectional shape (j=0 to n−1).

15. The method according to claim 14, wherein:

in the step of the interpolating, given that the characteristic amount of a j-th cross-section is fj(h), the characteristic amount regarding intermediate points on the rotationally asymmetrical aspherical f(h,θ) is interpolated in a direction of an angle of deviation θ in accordance with an equation:

$$f(h, \theta) = \frac{\{A_o(h) + A_{n/2}(h) \cdot \cos(n\theta/2)\}}{2} + \quad (2)$$

-continued
$$\sum_{k=1}^{n/2-1} \{A_k(h) \cdot \cos(k\theta) + B_k(h) \cdot \sin(k\theta)\}$$

where $$A_k(h) = 2/n \cdot \sum_{j=0}^{n-1} f_j(h) \cdot \cos(2\pi jk/n)$$

where k = 0, 1, ... n/2

$$B_k(h) = 2/n \cdot \sum_{j=0}^{n-1} f_j(h) \cdot \sin(2\pi jk/n)$$

where k = 1, 2, ... n/2 − 1.

16. The method according to claim 1, wherein the spectacle lens to be designed includes a cylindrical power.

17. The method according to claim 1, wherein the spectacle lens to be designed includes a prismatic power.

18. The method according to claim 1, wherein the spectacle lens to be designed has an aspheric amount which changes depending on a position on the spectacle lens.

19. The method according to claim 1, wherein the back surface of the spectacle lens is formed to be the rotationally asymmetrical aspherical surface.

20. A process of manufacturing a spectacle lens having a front surface and a back surface, at least one of the front and back surfaces is formed as a rotationally asymmetrical aspherical surface, comprising the steps of:

determining which of a plurality of vertex power groups, which are defined by classifying vertex powers into a plurality of groups according to magnitude of the vertex powers, a vertex power of the spectacle lens to be designed belongs to;

specifying an unprocessed lens belonging to a vertex power group, to which the spectacle lens to be designed belongs, from among a plurality of unprocessed lenses respectively corresponding to the plurality of vertex power groups, designing the spectacle lens using the method according to claim 1 based on specifications of the spectacle lens; and processing the unprocessed lens specified in the step of the specifying in accordance with a design result of the step of the designing.

* * * * *